(12) United States Patent
Zywicki et al.

(10) Patent No.: US 10,452,084 B2
(45) Date of Patent: Oct. 22, 2019

(54) OPERATION OF BUILDING CONTROL VIA REMOTE DEVICE

(75) Inventors: Stan Zywicki, Eden Prairie, MN (US); Jeffrey Boll, Brooklyn Park, MN (US); Daniel Simounet, Saint-Jean-sur-Richeliu (CA)

(73) Assignee: Ademco Inc., Golden Valley, MN (US)

( * ) Notice: Subject to any disclaimer, the term of this patent is extended or adjusted under 35 U.S.C. 154(b) by 1081 days.

(21) Appl. No.: 13/420,120

(22) Filed: Mar. 14, 2012

(65) Prior Publication Data
US 2013/0245838 A1   Sep. 19, 2013

(51) Int. Cl.
| F24F 11/56 | (2018.01) |
| G05D 23/19 | (2006.01) |
| F24F 11/30 | (2018.01) |
| F24F 110/10 | (2018.01) |

(52) U.S. Cl.
CPC .......... *G05D 23/1905* (2013.01); *F24F 11/30* (2018.01); *F24F 11/56* (2018.01); *F24F 2110/10* (2018.01)

(58) Field of Classification Search
CPC ...... G05D 23/2029; F24F 11/006; G01K 7/01
USPC .................................................. 700/276, 278
See application file for complete search history.

(56) References Cited

U.S. PATENT DOCUMENTS

| 4,079,366 A | 3/1978 | Wong |
| 4,174,807 A | 11/1979 | Smith et al. |
| 4,206,872 A | 6/1980 | Levine |
| 4,224,615 A | 9/1980 | Penz |
| 4,264,034 A | 4/1981 | Hyltin et al. |
| 4,296,334 A | 10/1981 | Wong |
| 4,298,946 A * | 11/1981 | Hartsell ............. G05D 23/1904 165/268 |
| 4,308,991 A | 1/1982 | Peinetti et al. |
| 4,332,352 A | 6/1982 | Jaeger |
| 4,337,822 A | 7/1982 | Hyltin et al. |
| 4,337,893 A | 7/1982 | Flanders et al. |
| 4,373,664 A | 2/1983 | Barker et al. |
| 4,379,483 A | 4/1983 | Farley |
| 4,382,544 A | 5/1983 | Stewart |
| 4,386,649 A | 6/1983 | Hines et al. |

(Continued)

FOREIGN PATENT DOCUMENTS

| DE | 3334117 | 4/1985 |
| EP | 0070414 | 1/1983 |

(Continued)

OTHER PUBLICATIONS

"Comfort™ Programmable Owner's Manual," Carrier Touch-N-Go™, 60 pages, 2010. Catalog No. OM-TCPHP-4CA, Replaces: OM-TCPHP-3CA.

(Continued)

*Primary Examiner* — Darrin D Dunn
(74) *Attorney, Agent, or Firm* — Shumaker & Sieffert, P.A.

(57) ABSTRACT

A remote control unit for interacting with one or more thermostats controlling an HVAC system may be mounted on wall near a point of entry to a building. The remote control unit may include a first selectable mode option corresponding to a first operating mode of the thermostat and a second selectable mode option corresponding to a second operating mode of the thermostat. The remote control unit may wirelessly send one or more commands to a thermostat to operate in one or more modes at a predetermined temperature associated with that mode.

24 Claims, 18 Drawing Sheets

(56) References Cited

U.S. PATENT DOCUMENTS

| | | |
|---|---|---|
| 4,388,692 A | 6/1983 | Jones et al. |
| 4,431,134 A | 2/1984 | Hendricks et al. |
| 4,442,972 A | 4/1984 | Sahay et al. |
| 4,446,913 A | 5/1984 | Krocker |
| 4,479,604 A | 10/1984 | Didner |
| 4,503,471 A | 3/1985 | Hanajima et al. |
| 4,506,827 A | 3/1985 | Jamieson et al. |
| 4,556,169 A | 12/1985 | Zervos |
| 4,585,164 A | 4/1986 | Butkovich et al. |
| 4,606,401 A | 8/1986 | Levine et al. |
| 4,621,336 A | 11/1986 | Brown |
| 4,622,544 A | 11/1986 | Bially et al. |
| 4,628,201 A | 12/1986 | Schmitt |
| 4,646,964 A | 3/1987 | Parker et al. |
| 4,717,333 A | 1/1988 | Carignan |
| 4,725,001 A | 2/1988 | Carney et al. |
| 4,837,731 A | 6/1989 | Levine et al. |
| 4,881,686 A | 11/1989 | Mehta |
| 4,918,439 A | 4/1990 | Wozniak et al. |
| 4,942,613 A | 7/1990 | Lynch |
| 4,948,040 A | 8/1990 | Kobayashi et al. |
| 4,969,508 A | 11/1990 | Tate et al. |
| 4,992,779 A | 2/1991 | Sugino et al. |
| 4,997,029 A | 3/1991 | Otsuka et al. |
| 5,005,365 A | 4/1991 | Lynch |
| 5,012,973 A | 5/1991 | Dick et al. |
| 5,036,698 A | 8/1991 | Conti |
| 5,038,851 A | 8/1991 | Metha |
| 5,053,752 A | 10/1991 | Epstein et al. |
| 5,065,813 A | 11/1991 | Berkeley et al. |
| 5,086,385 A | 2/1992 | Launey et al. |
| 5,088,645 A | 2/1992 | Bell |
| 5,140,310 A | 8/1992 | DeLuca et al. |
| 5,161,606 A | 11/1992 | Berkeley et al. |
| 5,170,935 A | 12/1992 | Federspiel et al. |
| 5,172,565 A | 12/1992 | Wruck et al. |
| 5,181,653 A | 1/1993 | Foster et al. |
| 5,187,797 A | 2/1993 | Nielsen et al. |
| 5,230,482 A | 7/1993 | Ratz et al. |
| 5,238,184 A | 8/1993 | Adams |
| 5,251,813 A | 10/1993 | Kniepkamp |
| 5,259,445 A | 11/1993 | Pratt et al. |
| 5,272,477 A | 12/1993 | Tashima et al. |
| 5,329,991 A | 7/1994 | Metha et al. |
| 5,348,078 A | 9/1994 | Dushane et al. |
| 5,351,035 A | 9/1994 | Chrisco |
| 5,386,577 A | 1/1995 | Zenda |
| 5,390,206 A | 2/1995 | Rein et al. |
| 5,404,934 A | 4/1995 | Carlson et al. |
| 5,414,618 A | 5/1995 | Mock et al. |
| 5,429,649 A | 7/1995 | Robin |
| 5,482,209 A | 1/1996 | Cochran et al. |
| 5,495,887 A | 3/1996 | Kathnelson et al. |
| 5,506,572 A | 4/1996 | Hills et al. |
| 5,526,422 A | 6/1996 | Keen |
| 5,537,106 A | 7/1996 | Mitcuhashi |
| 5,544,036 A | 8/1996 | Brown, Jr. et al. |
| 5,566,879 A | 10/1996 | Longtin |
| 5,570,837 A | 11/1996 | Brown et al. |
| 5,590,831 A | 1/1997 | Manson et al. |
| 5,603,451 A | 2/1997 | Helander et al. |
| 5,654,813 A | 8/1997 | Whitworth |
| 5,668,535 A | 9/1997 | Hendrix et al. |
| 5,671,083 A | 9/1997 | Conner et al. |
| 5,673,850 A | 10/1997 | Uptegraph |
| 5,679,137 A | 10/1997 | Erdman et al. |
| 5,682,206 A | 10/1997 | Wehmeyer et al. |
| 5,711,785 A | 1/1998 | Maxwell |
| 5,732,691 A | 3/1998 | Maiello et al. |
| 5,761,083 A | 6/1998 | Brown, Jr. et al. |
| 5,782,296 A | 7/1998 | Metha |
| 5,810,908 A | 9/1998 | Gray et al. |
| 5,818,428 A | 10/1998 | Eisenbrandt et al. |
| 5,833,134 A | 11/1998 | Ho et al. |
| 5,839,654 A * | 11/1998 | Weber ............... G05D 23/1905 236/47 |
| 5,840,094 A | 11/1998 | Osendorf et al. |
| 5,862,737 A | 1/1999 | Chin et al. |
| 5,873,519 A * | 2/1999 | Beilfuss ............ G05D 23/1904 165/238 |
| 5,886,697 A | 3/1999 | Naughton et al. |
| 5,901,183 A | 5/1999 | D'Souza |
| 5,902,183 A | 5/1999 | D'Souza |
| 5,909,429 A | 6/1999 | Satyanarayana et al. |
| 5,915,473 A | 6/1999 | Ganesh et al. |
| 5,917,141 A | 6/1999 | Naquin, Jr. |
| 5,917,416 A | 6/1999 | Read |
| D413,328 S | 8/1999 | Kazama |
| 5,937,942 A | 8/1999 | Bias et al. |
| 5,947,372 A | 9/1999 | Tiernan |
| 5,950,709 A | 9/1999 | Krueger et al. |
| 5,996,179 A * | 12/1999 | Huong ............... H04M 1/0216 16/284 |
| 6,009,355 A | 12/1999 | Obradovich et al. |
| 6,012,515 A * | 1/2000 | Stubbendorff ......... B64D 13/08 165/254 |
| 6,013,121 A | 1/2000 | Chin et al. |
| 6,020,881 A | 2/2000 | Naughton et al. |
| 6,032,867 A | 3/2000 | Dushane et al. |
| D422,594 S | 4/2000 | Henderson et al. |
| 6,059,195 A | 5/2000 | Adams et al. |
| 6,081,197 A | 6/2000 | Garrick et al. |
| 6,084,523 A | 7/2000 | Gelnovatch et al. |
| 6,101,824 A | 8/2000 | Meyer et al. |
| 6,104,963 A | 8/2000 | Cebasek et al. |
| 6,116,512 A * | 9/2000 | Dushane ............ G05D 23/1905 165/238 |
| 6,119,125 A | 9/2000 | Gloudeman et al. |
| 6,121,875 A | 9/2000 | Hamm et al. |
| 6,140,987 A | 10/2000 | Stein et al. |
| 6,141,595 A | 10/2000 | Gloudeman et al. |
| 6,145,751 A | 11/2000 | Ahmed et al. |
| 6,149,065 A | 11/2000 | White et al. |
| 6,152,375 A | 11/2000 | Robison |
| 6,154,681 A | 11/2000 | Drees et al. |
| 6,167,316 A | 12/2000 | Gloudeman et al. |
| 6,190,442 B1 | 2/2001 | Redner |
| 6,192,282 B1 | 2/2001 | Smith et al. |
| 6,196,467 B1 | 3/2001 | Dushane et al. |
| 6,208,331 B1 | 3/2001 | Singh et al. |
| 6,216,956 B1 | 4/2001 | Ehlers et al. |
| 6,236,326 B1 | 5/2001 | Murphy |
| 6,259,074 B1 | 7/2001 | Brunner et al. |
| 6,260,765 B1 | 7/2001 | Natale et al. |
| 6,285,912 B1 | 9/2001 | Ellison et al. |
| 6,290,140 B1 | 9/2001 | Pesko et al. |
| D448,757 S | 10/2001 | Okubo |
| 6,315,211 B1 | 11/2001 | Sartain et al. |
| 6,318,639 B1 | 11/2001 | Toth |
| 6,321,637 B1 | 11/2001 | Shanks et al. |
| 6,330,806 B1 | 12/2001 | Beaverson et al. |
| 6,351,693 B1 | 2/2002 | Monie et al. |
| 6,344,861 B1 | 3/2002 | Naughton et al. |
| 6,385,510 B1 | 5/2002 | Hoog et al. |
| 6,394,359 B1 | 5/2002 | Morgan |
| 6,398,118 B1 | 6/2002 | Rosen et al. |
| 6,448,896 B1 | 9/2002 | Bankus et al. |
| 6,449,726 B1 | 9/2002 | Smith |
| 6,453,687 B2 | 9/2002 | Sharood et al. |
| D464,948 S | 10/2002 | Vasquez et al. |
| 6,460,774 B2 | 10/2002 | Sumida et al. |
| 6,466,132 B1 | 10/2002 | Caronna et al. |
| 6,478,233 B1 | 11/2002 | Shah |
| 6,502,758 B2 | 1/2003 | Cottrell |
| 6,507,282 B1 | 1/2003 | Sherwood |
| 6,518,953 B1 | 2/2003 | Armstrong |
| 6,518,957 B1 | 2/2003 | Lehtinen et al. |
| 6,546,419 B1 | 4/2003 | Humpleman et al. |
| 6,556,899 B1 | 4/2003 | Harvey et al. |
| 6,574,537 B2 | 6/2003 | Kipersztok et al. |
| 6,578,770 B1 | 6/2003 | Rosen |
| 6,580,950 B1 | 6/2003 | Johnson et al. |
| 6,581,846 B1 | 6/2003 | Rosen |

(56) References Cited

U.S. PATENT DOCUMENTS

| | | | |
|---|---|---|---|
| 6,595,430 B1 | 7/2003 | Shah | |
| 6,596,059 B1 | 7/2003 | Greist et al. | |
| D478,051 S | 8/2003 | Sagawa | |
| 6,608,560 B2 | 8/2003 | Abrams | |
| 6,619,555 B2 | 9/2003 | Rosen | |
| 6,621,507 B1 | 9/2003 | Shah | |
| 6,663,010 B2 | 12/2003 | Chene et al. | |
| 6,685,098 B2 | 2/2004 | Okano et al. | |
| 6,726,112 B1 | 4/2004 | Ho | |
| D492,282 S | 6/2004 | Lachello et al. | |
| 6,783,079 B2 | 8/2004 | Carey et al. | |
| 6,786,421 B2 | 9/2004 | Rosen | |
| 6,789,739 B2 | 9/2004 | Rosen | |
| 6,801,849 B2 | 10/2004 | Szukala et al. | |
| 6,810,307 B1 | 10/2004 | Addy | |
| 6,810,397 B1 | 10/2004 | Qian et al. | |
| 6,824,069 B2 | 11/2004 | Rosen | |
| 6,824,539 B2* | 11/2004 | Novak | A61B 90/36 606/1 |
| 6,833,990 B2 | 12/2004 | LaCroix et al. | |
| 6,842,721 B2 | 1/2005 | Kim et al. | |
| 6,845,387 B1* | 1/2005 | Prestas | H04L 29/06 370/360 |
| 6,868,293 B1 | 3/2005 | Schurr et al. | |
| 6,901,457 B1* | 5/2005 | Toombs | G06K 7/10297 710/11 |
| D512,208 S | 12/2005 | Kubo et al. | |
| 6,973,410 B2 | 12/2005 | Seigel | |
| 7,001,495 B2 | 2/2006 | Essalik et al. | |
| D520,989 S | 5/2006 | Miller | |
| 7,050,026 B1 | 5/2006 | Rosen | |
| 7,055,759 B2 | 6/2006 | Wacker et al. | |
| 7,080,358 B2 | 7/2006 | Kuzmin | |
| 7,083,109 B2 | 8/2006 | Pouchak | |
| 7,083,189 B2 | 8/2006 | Ogata | |
| 7,084,774 B2 | 8/2006 | Martinez | |
| 7,089,088 B2 | 8/2006 | Terry et al. | |
| 7,108,194 B1 | 9/2006 | Hankins, II | |
| 7,130,719 B2* | 10/2006 | Ehlers | G06Q 10/10 700/276 |
| 7,130,720 B2 | 10/2006 | Fisher | |
| D531,588 S | 11/2006 | Peh | |
| D533,515 S | 12/2006 | Klein et al. | |
| 7,146,253 B2 | 12/2006 | Hoog et al. | |
| 7,152,806 B1 | 12/2006 | Rosen | |
| 7,156,318 B1 | 1/2007 | Rosen | |
| 7,163,156 B2 | 1/2007 | Kates | |
| 7,188,002 B2 | 3/2007 | Chapman, Jr. et al. | |
| D542,236 S | 5/2007 | Klein et al. | |
| 7,212,887 B2 | 5/2007 | Shah et al. | |
| 7,222,800 B2 | 5/2007 | Wruck | |
| 7,225,054 B2 | 5/2007 | Amundson et al. | |
| 7,231,605 B1 | 6/2007 | Ramakesavan | |
| 7,232,075 B1 | 6/2007 | Rosen | |
| 7,240,289 B2 | 7/2007 | Naughton et al. | |
| 7,261,762 B2 | 8/2007 | Kang et al. | |
| 7,274,973 B2 | 9/2007 | Nichols et al. | |
| 7,302,642 B2 | 11/2007 | Smith et al. | |
| 7,331,187 B2 | 2/2008 | Kates | |
| 7,341,201 B2 | 3/2008 | Stanimirovic | |
| 7,354,005 B2 | 4/2008 | Carey et al. | |
| RE40,437 E | 7/2008 | Rosen | |
| 7,419,532 B2 | 9/2008 | Sellers et al. | |
| 7,435,278 B2 | 10/2008 | Terlson | |
| 7,451,606 B2 | 11/2008 | Harrod | |
| 7,452,396 B2 | 11/2008 | Terlson et al. | |
| 7,496,627 B2 | 2/2009 | Moorer et al. | |
| 7,505,914 B2 | 3/2009 | McCall | |
| 7,529,268 B1* | 5/2009 | Solanki | H04L 12/403 370/362 |
| 7,542,867 B2 | 6/2009 | Steger et al. | |
| 7,556,207 B2 | 7/2009 | Mueller et al. | |
| 7,594,960 B2 | 9/2009 | Johansson | |
| 7,604,046 B2 | 10/2009 | Bergman et al. | |
| 7,617,691 B2 | 11/2009 | Street et al. | |
| 7,644,591 B2 | 1/2010 | Singh et al. | |
| 7,665,019 B2 | 2/2010 | Jaeger | |
| 7,676,282 B2 | 3/2010 | Bosley | |
| 7,693,583 B2* | 4/2010 | Wolff | F24F 11/0012 700/17 |
| 7,707,189 B2 | 4/2010 | Haselden et al. | |
| 7,713,339 B2 | 5/2010 | Johansson | |
| 7,725,731 B2* | 5/2010 | Brown | G06F 21/85 713/183 |
| 7,739,282 B1 | 6/2010 | Smith et al. | |
| 7,766,246 B2* | 8/2010 | Mulhouse | F24F 11/0012 236/1 B |
| 7,770,242 B2 | 8/2010 | Sell | |
| 7,793,056 B2 | 9/2010 | Boggs et al. | |
| 7,814,516 B2 | 10/2010 | Stecyk et al. | |
| 7,865,252 B2 | 1/2011 | Clayton | |
| 7,941,431 B2 | 5/2011 | Bluhm et al. | |
| 7,952,485 B2 | 5/2011 | Schechter et al. | |
| 7,957,775 B2 | 6/2011 | Allen, Jr. et al. | |
| 7,957,839 B2* | 6/2011 | Takach | F24F 13/20 236/49.3 |
| 7,984,220 B2 | 7/2011 | Gerard et al. | |
| 8,032,254 B2 | 10/2011 | Amundson et al. | |
| 8,059,573 B2* | 11/2011 | Julian | H04W 4/21 370/312 |
| 8,087,593 B2 | 1/2012 | Leen | |
| 8,091,795 B1* | 1/2012 | McLellan | G05D 23/1923 236/51 |
| 8,091,796 B2 | 1/2012 | Amundson et al. | |
| 8,165,886 B1* | 4/2012 | Gagnon | G10L 15/19 704/275 |
| 8,167,216 B2 | 5/2012 | Schultz et al. | |
| 8,224,918 B2* | 7/2012 | McCarthy | H04L 67/1097 370/401 |
| 8,239,066 B2 | 8/2012 | Jennings et al. | |
| 8,280,556 B2 | 10/2012 | Besore et al. | |
| 8,775,848 B2* | 7/2014 | Venkatakrishnan | G06Q 50/06 206/216 |
| 8,802,981 B2* | 8/2014 | Wallaert | F24F 11/00 174/58 |
| 8,862,973 B2* | 10/2014 | Bains | G06F 11/1016 714/800 |
| 8,918,219 B2* | 12/2014 | Sloo | G05D 23/1902 700/276 |
| 9,119,236 B1* | 8/2015 | Martin | G05B 15/02 |
| 9,151,510 B2* | 10/2015 | Leen | F24F 11/006 |
| 9,380,337 B2* | 6/2016 | Demas | G06T 9/004 |
| 9,920,946 B2* | 3/2018 | Gourlay | G05D 23/1905 |
| 2001/0025349 A1 | 9/2001 | Sharood et al. | |
| 2001/0029585 A1 | 10/2001 | Simon et al. | |
| 2001/0042684 A1 | 11/2001 | Essalik et al. | |
| 2001/0052459 A1 | 12/2001 | Essalik et al. | |
| 2002/0005435 A1 | 1/2002 | Cottrell | |
| 2002/0011923 A1* | 1/2002 | Cunningham | H04B 3/542 340/12.32 |
| 2002/0022991 A1 | 2/2002 | Sharood et al. | |
| 2002/0060701 A1 | 5/2002 | Naughton et al. | |
| 2002/0082746 A1 | 6/2002 | Schubring et al. | |
| 2002/0092779 A1 | 7/2002 | Essalik et al. | |
| 2002/0096572 A1 | 7/2002 | Chene et al. | |
| 2002/0138184 A1 | 9/2002 | Kipersztok et al. | |
| 2002/0171624 A1 | 11/2002 | Stecyk et al. | |
| 2002/0173929 A1 | 11/2002 | Seigel | |
| 2003/0000692 A1 | 1/2003 | Takaski et al. | |
| 2003/0014179 A1 | 1/2003 | Szukala et al. | |
| 2003/0025738 A1* | 2/2003 | Polgar | G06F 3/04886 715/835 |
| 2003/0033156 A1 | 2/2003 | McCall | |
| 2003/0033230 A1 | 2/2003 | McCall | |
| 2003/0034897 A1 | 2/2003 | Shamoon et al. | |
| 2003/0034898 A1* | 2/2003 | Shamoon | G08C 17/02 340/12.22 |
| 2003/0038730 A1* | 2/2003 | Imafuku | G08C 17/00 340/4.3 |
| 2003/0070544 A1 | 4/2003 | Mulvaney et al. | |
| 2003/0074489 A1 | 4/2003 | Steger et al. | |
| 2003/0103075 A1 | 6/2003 | Rosselot | |

(56) References Cited

U.S. PATENT DOCUMENTS

| | | |
|---|---|---|
| 2003/0121652 A1 | 7/2003 | Carey et al. |
| 2003/0123224 A1 | 7/2003 | LaCroix et al. |
| 2003/0136135 A1 | 7/2003 | Kim et al. |
| 2003/0142121 A1 | 7/2003 | Rosen |
| 2003/0150926 A1 | 8/2003 | Rosen |
| 2003/0150927 A1 | 8/2003 | Rosen |
| 2003/0177012 A1 | 9/2003 | Drennen |
| 2003/0193426 A1* | 10/2003 | Vidal ................. G08C 17/02 341/176 |
| 2003/0233154 A1* | 12/2003 | Kobziar ............... G05B 19/042 700/13 |
| 2004/0193324 A1 | 3/2004 | Hoog et al. |
| 2004/0074978 A1 | 4/2004 | Rosen |
| 2004/0133314 A1* | 7/2004 | Ehlers ................ G06Q 10/10 700/276 |
| 2004/0245352 A1 | 12/2004 | Smith |
| 2004/0262410 A1 | 12/2004 | Hull |
| 2004/0268391 A1* | 12/2004 | Clercq ................ H01H 9/0235 725/37 |
| 2005/0036509 A1* | 2/2005 | Acharya ............. H04L 63/0428 370/466 |
| 2005/0040249 A1* | 2/2005 | Wacker ............... G05D 23/1905 236/51 |
| 2005/0040250 A1* | 2/2005 | Wruck ................ C09D 5/4492 236/51 |
| 2005/0083168 A1* | 4/2005 | Breitenbach ....... G05D 23/1904 337/380 |
| 2005/0150967 A1* | 7/2005 | Chapman, Jr. ........ F24H 9/2007 236/51 |
| 2005/0203647 A1* | 9/2005 | Landry ............... H04L 12/2818 700/83 |
| 2005/0270151 A1* | 12/2005 | Winick ................ G08B 17/00 340/539.1 |
| 2006/0026972 A1* | 2/2006 | Masui ................. F24F 11/30 62/127 |
| 2006/0032379 A1 | 2/2006 | Kates |
| 2006/0071086 A1* | 4/2006 | Kates ................. F24F 11/62 236/1 B |
| 2006/0084305 A1* | 4/2006 | Chen ................. H01H 13/705 439/159 |
| 2006/0109138 A1* | 5/2006 | Chiang .............. G08C 19/28 340/12.29 |
| 2006/0156285 A1* | 7/2006 | Jensen .............. G06F 9/4411 717/120 |
| 2006/0168342 A1 | 7/2006 | Budde et al. |
| 2006/0172182 A1* | 8/2006 | Barton ............... H01M 2/1055 429/96 |
| 2006/0186213 A1 | 8/2006 | Carey et al. |
| 2006/0190138 A1* | 8/2006 | Stone ................. F24F 11/30 700/276 |
| 2006/0196953 A1 | 9/2006 | Simon et al. |
| 2006/0219799 A1 | 10/2006 | Schultz et al. |
| 2006/0242591 A1 | 10/2006 | Van Dok et al. |
| 2006/0248267 A1* | 11/2006 | Xie ................... G06F 12/0246 711/103 |
| 2007/0013534 A1 | 1/2007 | DiMaggio |
| 2007/0029397 A1 | 2/2007 | Mueller et al. |
| 2007/0043478 A1* | 2/2007 | Ehlers ............... F24F 11/0012 700/276 |
| 2007/0045429 A1 | 3/2007 | Chapman, Jr. et al. |
| 2007/0045430 A1* | 3/2007 | Chapman, Jr. ...... G05D 23/1902 236/46 C |
| 2007/0114293 A1* | 5/2007 | Gugenheim ......... F24F 11/30 236/49.3 |
| 2007/0114295 A1* | 5/2007 | Jenkins ............. G05D 23/1905 236/51 |
| 2007/0171091 A1* | 7/2007 | Nisenboim .......... G08C 17/00 340/12.24 |
| 2007/0277061 A1 | 11/2007 | Ashe |
| 2007/0278320 A1 | 12/2007 | Lunacek et al. |
| 2007/0289731 A1 | 12/2007 | Deligiannis et al. |
| 2008/0013259 A1* | 1/2008 | Barton ............... H05K 5/0013 361/809 |
| 2008/0015740 A1 | 1/2008 | Osann, Jr. |
| 2008/0029611 A1* | 2/2008 | Schnell ............. F24F 3/14 236/44 C |
| 2008/0097651 A1* | 4/2008 | Shah ................. F24F 11/0086 700/277 |
| 2008/0109964 A1* | 5/2008 | Flocard ............. A61G 7/05776 5/713 |
| 2008/0217419 A1* | 9/2008 | Ehlers .............. G08B 21/20 236/44 C |
| 2008/0256475 A1* | 10/2008 | Amundson ........ G05B 19/0426 715/772 |
| 2008/0297369 A1* | 12/2008 | Pittard ............. H04B 1/202 340/4.32 |
| 2009/0127346 A1* | 5/2009 | Grohman .......... F24D 19/1084 236/10 |
| 2009/0140056 A1* | 6/2009 | Leen ................ G05B 13/02 236/49.3 |
| 2009/0140057 A1* | 6/2009 | Leen ................ F24F 11/006 236/49.3 |
| 2009/0140058 A1* | 6/2009 | Koster .............. F24F 11/006 236/49.3 |
| 2009/0140060 A1 | 6/2009 | Stoner et al. |
| 2009/0140062 A1 | 6/2009 | Amundson et al. |
| 2009/0140063 A1* | 6/2009 | Koster .............. F24F 11/006 236/51 |
| 2009/0140064 A1* | 6/2009 | Schultz ............. F24F 11/006 236/51 |
| 2009/0143879 A1 | 6/2009 | Amundsom et al. |
| 2009/0143880 A1 | 6/2009 | Amundson et al. |
| 2009/0143916 A1 | 6/2009 | Boll et al. |
| 2009/0143918 A1* | 6/2009 | Amundson ........ G05B 13/02 700/278 |
| 2009/0165644 A1 | 7/2009 | Campbell |
| 2009/0195349 A1* | 8/2009 | Frader-Thompson ........ G01D 4/002 340/3.1 |
| 2009/0199212 A1 | 8/2009 | Schneider |
| 2009/0234513 A1* | 9/2009 | Wiggins ........... F24D 19/1051 700/300 |
| 2009/0282357 A1* | 11/2009 | Schultz ............ F24F 11/30 715/771 |
| 2009/0314846 A1* | 12/2009 | Helt ................ G05D 23/1905 236/46 R |
| 2010/0008422 A1 | 1/2010 | Shimizu et al. |
| 2010/0050075 A1* | 2/2010 | Thorson ........... B60H 1/00985 715/702 |
| 2010/0070089 A1* | 3/2010 | Harrod ............. G05B 19/042 700/277 |
| 2010/0070093 A1* | 3/2010 | Harrod ............. G05B 19/042 700/278 |
| 2010/0084482 A1* | 4/2010 | Kennedy .......... F24F 11/30 236/51 |
| 2010/0106305 A1* | 4/2010 | Pavlak ............. G05D 23/1902 700/276 |
| 2010/0107112 A1 | 4/2010 | Jennings et al. |
| 2010/0138764 A1* | 6/2010 | Hatambeiki ....... G08C 17/02 715/765 |
| 2010/0161574 A1 | 6/2010 | Davidson et al. |
| 2010/0163633 A1* | 7/2010 | Barrett ............ B60H 1/00871 236/49.3 |
| 2010/0197238 A1 | 8/2010 | Pathuri et al. |
| 2010/0204834 A1* | 8/2010 | Comerford ....... G05D 23/1902 700/276 |
| 2010/0212879 A1* | 8/2010 | Schnell ............ F24F 3/14 165/230 |
| 2011/0010621 A1* | 1/2011 | Wallaert ........... B60H 1/00985 715/702 |
| 2011/0010653 A1* | 1/2011 | Wallaert ........... G05D 23/1902 715/771 |
| 2011/0010660 A1* | 1/2011 | Thorson ........... B60H 1/00985 715/790 |
| 2011/0061527 A1 | 3/2011 | Sullivan |
| 2011/0078515 A1 | 3/2011 | Yasukawa |
| 2011/0093424 A1 | 4/2011 | Zimmermann et al. |
| 2011/0105041 A1* | 5/2011 | Maruyama ........ G08C 17/02 455/66.1 |

(56) References Cited

U.S. PATENT DOCUMENTS

| | | | |
|---|---|---|---|
| 2011/0106279 A1* | 5/2011 | Cho | G08C 17/02 700/90 |
| 2011/0119870 A1* | 5/2011 | Hanley | A47K 3/34 16/94 R |
| 2011/0132991 A1* | 6/2011 | Moody | G05D 23/1902 236/46 R |
| 2011/0185895 A1 | 8/2011 | Freen | |
| 2011/0213225 A1* | 9/2011 | Bernstein | G06Q 50/22 600/309 |
| 2011/0231020 A1* | 9/2011 | Ramachandran | G05D 23/1905 700/278 |
| 2011/0268448 A1* | 11/2011 | O'Callaghan | H04N 5/4403 398/106 |
| 2012/0005555 A1* | 1/2012 | Lee | G06F 11/1008 714/758 |
| 2012/0012662 A1* | 1/2012 | Leen | F24F 11/0012 236/51 |
| 2012/0036212 A1* | 2/2012 | McCarthy | G06F 17/30575 709/206 |
| 2012/0044052 A1* | 2/2012 | Davis | G07C 5/0825 340/6.1 |
| 2012/0048955 A1* | 3/2012 | Lin | F23N 5/203 236/46 R |
| 2012/0061480 A1* | 3/2012 | Deligiannis | G05B 15/02 236/51 |
| 2012/0072033 A1* | 3/2012 | Imes | F24F 11/63 700/278 |
| 2012/0116593 A1* | 5/2012 | Amundson | G05B 13/02 700/276 |
| 2012/0130513 A1* | 5/2012 | Hao | G05B 15/02 700/90 |
| 2012/0131504 A1* | 5/2012 | Fadell | F24D 19/1084 715/810 |
| 2012/0144416 A1* | 6/2012 | Wetzer | H04N 21/25816 725/14 |
| 2012/0203379 A1* | 8/2012 | Sloo | G05D 23/1902 700/276 |
| 2012/0232703 A1* | 9/2012 | Moore | G05D 23/1904 700/278 |
| 2012/0263525 A1* | 10/2012 | Bare | E01F 13/12 404/6 |
| 2012/0318073 A1 | 12/2012 | Zavodny et al. | |
| 2012/0318135 A1 | 12/2012 | Hoglund et al. | |
| 2012/0318137 A1 | 12/2012 | Ragland et al. | |
| 2012/0318138 A1 | 12/2012 | Bisson et al. | |
| 2012/0319851 A1 | 12/2012 | Hoglund et al. | |
| 2012/0323374 A1 | 12/2012 | Dean-Hendricks et al. | |
| 2012/0323375 A1 | 12/2012 | Dean-Hendricks et al. | |
| 2012/0323377 A1 | 12/2012 | Hoglund et al. | |
| 2013/0066472 A1* | 3/2013 | Harrod | F24F 11/0086 700/276 |
| 2013/0116832 A1* | 5/2013 | Grabinger | F24F 11/0076 700/276 |
| 2013/0158718 A1* | 6/2013 | Barton | F24F 11/30 700/276 |
| 2013/0238142 A1* | 9/2013 | Nichols | G05B 15/02 700/277 |
| 2013/0245838 A1* | 9/2013 | Zywicki | G05D 23/1905 700/278 |
| 2013/0297078 A1* | 11/2013 | Kolavennu | G05D 23/1917 700/276 |
| 2014/0031989 A1* | 1/2014 | Bergman | G05D 23/19 700/276 |
| 2014/0031991 A1* | 1/2014 | Bergman | G05D 23/19 700/276 |
| 2014/0039692 A1* | 2/2014 | Leen | F24F 11/006 700/278 |
| 2014/0052300 A1* | 2/2014 | Matsuoka | G05D 23/1917 700/276 |
| 2014/0156087 A1* | 6/2014 | Amundson | G05B 15/02 700/278 |
| 2014/0158782 A1* | 6/2014 | Kates | G05D 23/1934 236/1 B |

FOREIGN PATENT DOCUMENTS

| | | |
|---|---|---|
| EP | 0434926 | 8/1995 |
| EP | 0678204 | 3/2000 |
| EP | 0985994 | 3/2000 |
| EP | 1033641 | 9/2000 |
| EP | 1074009 | 7/2001 |
| EP | 1143232 | 10/2001 |
| EP | 2138919 | 12/2009 |
| FR | 2711230 | 4/1995 |
| WO | WO 97/11448 | 3/1997 |
| WO | WO 97/39392 | 10/1997 |
| WO | WO 00/43870 | 7/2000 |
| WO | WO 01/52515 | 7/2001 |
| WO | WO 01/79952 | 10/2001 |
| WO | WO 02/23744 | 3/2002 |
| WO | WO 2010/021700 | 2/2010 |

OTHER PUBLICATIONS

"CorAccess Systems/In Home," http://web.archive.org/web20011212084427/www.coraccess.com/home.html, 1 page, copyright 2001, printed Aug. 19, 2004.
"HAI Company Background," http://www.homeauto.com/AboutHAI/abouthai_main.htm, 2 pages, printed Aug. 19, 2004.
"High-tech options take hold in new homes—200-08-28—Dallas Business Journal," http://bizjournals.com/dallas/stories/2000/08/28/focus4, 3 pages, dated Aug. 28, 2000, printed Aug. 19, 2004.
"Home Toys Review—TouchLinc", http://www.hometoys.com/htinews/aug99/reviews/touchlinc/touchlinc.htm, 3 pages, dated Aug. 1999, printed Aug. 20, 2004.
"HTI News Release," http://www.hometoys.com/htinews/apr99/releases/ha101.htm, 3 pages, Apr. 1999.
"Mark of Excellence Award Finalist Announced," http://64.233.167.104/search?Q=cache:ciOA2YtYaBIJ:www.hometoys.com/releases/mar . . . , 6 pages, Leopard Touchscreen on p. 2, dated prior to Mar. 4, 2000, printed Aug. 20, 2004.
"Product Review—Philips Pronto Remote Control," http://hometheaterhifi.com/volume_6_2/philipsprontoremotecontrol.html, 5 pages, dated May 1999, printed Aug. 20, 2004.
"RC X10 Automation Forum: Control your Heating and Cooling System with Pronto(1/1)," http://www.remotecentral.com/cgi-bin/mboard/rc-x10/thread.cgi?12, 2 pages, dated Apr. 23, 1999, printed Aug. 20, 2004.
"RCS X10 Thermostat Plug-In for Home Seer Beta Version," 25 pages, Downloaded Sep. 9, 2011. 2.0.105.
"Spotlight on integrated systems," Custom Builder, V8, N2, p. 66(6), Mar.-Apr. 1993.
"Vantage Expands Controls for Audio/Video, HVAC and Security," http://www.hometoys.com/htinews/aug99/releases/vantage03.htm, 2 pages, dated Aug. 3, 1999, printed Aug. 20, 2004.
ADI, "Leopard User Manual," 93 pages, 2001.
Adicon 2500, "The Automator," 4 pages, Oct.-Dec. 2000.
ADT Security Services, "iCenter Advanced User Interface 8142ADT," Installation and Setup Guide, 4 pages, May 2001; First Sale Feb. 2001.
AED Electronics, Inc., "Presenting Climatouch the Most Innovative Thermostat in the World!," 2 pages, prior to Nov. 30, 2007.
Andrews et al., "Clicky: User-Centric Input for Active Spaces," 17 pages, Aug. 2004.
Aprilaire Electronic Thermostats Models 8344, 8346, 8348, 8363, 8365, 8366 Operating Instructions, 8 pages, 2003.

(56) References Cited

OTHER PUBLICATIONS

Aube Technologies, Electronic Thermostat for Heating System Model TH135-01, 5 pages, Aug. 14, 2001.
Aube Technologies, TH140-28 Electronic Programmable Thermostat, Installation Instructions and User Guide, pp. 1-4, Jan. 22, 2004.
AutomatedBuildings.com Article—"Thin Client" Solutions, "Pressure, Air Flow, Temperature, Humidity & Valves," Dwyer Instruments, Inc., 5 pages, printed Sep. 20, 2004.
Blake et al., "Seng 310 Final Project Demo Program" Illustration, 3 pages, Apr. 6, 2001.
Blake et al., "Seng 310 Final Project" Report, dated Apr. 6, 2001.
Blister Pack Insert from a Ritetemp 8082 Touch Screen Thermostat Product, 2 pages, 2002.
Braeburn Model 3000 Owner's Manual, pp. 1-13, 2001.
Braeburn Model 5000 Owners Manual, pp. 1-17, 2001.
BRK Electronics Maximum Protection Plus Ultimate Convenience Smoke Alarm, 24 pages, Sep. 2000.
BRK First Alert, User's Manual, Smoke and Fire Alarms, pp. 1-7, Nov. 2002.
Business Wire, "MicroTouch Specialty Products Group to Capitalize on Growing Market for Low-Cost Digital Matrix Touchscreens," p1174 (2 pages), Jan. 6, 1999.
Cardio Manual, available at http://www.secant.ca/En/Documentation/Cardio2é-Manual.pdf, Cardio Home Automation Inc., 55 pages, printed Sep. 28, 2004.
Cardio, by Secant; http://www.hometoys.com/htinews/apr98/reviews/cardio.htm, "HTINews Review," Feb. 1998, 5 pages, printed Sep. 14, 2004.
Carrier Microelectronic Programmable Thermostat Owner's Manual, pp. 1-24, May 1994.
Carrier TSTATCCRF01 Programmable Digital Thermostat, pp. 1-21, prior to Apr. 21, 2005.
Carrier, "Edge Performance Programmable Owner's Manual," 64 pages, 2007.
Carrier, "Programmable Dual Fuel Thermostats," Installation, Start-Up & Operating Instructions, pp. 1-12, Oct. 1998.
Carrier, "Programmable Thermostats," Installation, Start-Up & Operating Instructions, pp. 1-16, Sep. 1998.
Carrier, "Standard Programmable Thermostat," Homeowner's Manual, pp. 1-8 pages, 1998.
Carrier, "Thermidistat Control," Installation, Start-Up, and Operating Instructions, pp. 1-12, Aug. 1999.
Climatouch, User Manual, Climatouch CT03TSB Thermostat, Climatouch CT03TSHB Thermostat with Humidity Control, Outdoor UHF Temperature Transmitter 217S31, 19 pages, Printed Sep. 15, 2004.
U.S. Appl. No. 13/434,778, filed Mar. 29, 2012.
U.S. Appl. No. 13/227,395, filed Sep. 11, 2011.
U.S. Appl. No. 13/325,300, filed Dec. 14, 2011.
U.S. Appl. No. 13/325,315, filed Dec. 14, 2011.
U.S. Appl. No. 13/325,503, filed Dec. 14, 2011.
U.S. Appl. No. 13/325,515, filed Dec. 14, 2011.
U.S. Appl. No. 13/325,525, filed Dec. 14, 2011.
U.S. Appl. No. 13/325,554, filed Dec. 14, 2011.
U.S. Appl. No. 13/325,617, filed Dec. 14, 2011.
U.S. Appl. No. 13/326,553, filed Dec. 15, 2011.
U.S. Appl. No. 13/415,743, filed Mar. 8, 2012.
CorAccess, "Companion 6," User Guide, pp. 1-20, Jun. 17, 2002.
Danfoss RT51/51RF & RT52/52RF User Instructions, 2 pages, Jun. 2004.
DeKoven et al., "Designing Collaboration in Consumer Products," 2 pages, 2001.
DeKoven et al., "Measuring Task Models in Designing Intelligent Products," 2 pages, Jan. 13-16, 2002.
DESA Heating Products, "Wireless Hand-Held Remote Control Sets Models (C) GHRCB and (C)GHRCTB, Operating Instructions," 4 pages, May 2003.
Domotique Secant Home Automation—Web Page, available at http://www.secant.ca/En/Company/Default.asp, 1 page, printed Sep. 28, 2004.

Emme Core User Guide, Version 1.1, 47 pages, Jan. 2011.
Firex Smoke Alarm, Ionization Models AD, ADC Photoelectric Model Pad, 4 pages, prior to Apr. 21, 2005.
Fluke, "561 HVAC Pro" Infrared Thermometer Users Manual, 22 pages, Downloaded May 24, 2012. 11-99.
Freudenthal et al., "Communicating extensive smart home functionality to users of all ages: the design of a mixed-initiative multimodal thermostat-interface," pp. 34-39, Mar. 12-13, 2001.
Gentex Corporation, HD135, 135° Fixed Temperature Heat Detector AC Pwered, 120V, 60Hz With Battery Backup, Installation Instructions—Owner's Information, pp. 1-5, Jun. 1, 1998.
Gentex Corporation, 9000 Series, Photoelectric Type Single Station/Multi-Station Smoke Alarms AC Powered With Battery Backup, Installation Instructions—Owner's Information, pp. 9-1 to 9-6, Jan. 1, 1993.
Harris et al., "Optimizing Memory Transactions," Microsoft Research Havard University, 12 pages, May 25, 2012.
Honeywell Brivis Deluxe Programmable Thermostat, pp. 1-20, 2002.
Honeywell Brivis T8602C Chronotherm IV Deluxe Programmable Thermostats, Installation Instructions, pp. 1-12, 2002.
Honeywell CT8602C Professional Fuel Saver Thermostat, pp. 1-6, 1995.
Honeywell Electronic Programmable Thermostat, Owner's Guide, pp. 1-20, 2003.
Honeywell Electronic Programmable Thermostats, Installation Instructions, pp. 1-8, 2003.
Honeywell News Release, "Honeywell's New Sysnet Facilities Integration System for Boiler Plant and Combustion Safety Processes," 4 pages, Dec. 15, 1995.
Honeywell T8002 Programmable Thermostat, Installation Instructions, pp. 1-8, 2002.
Honeywell T8602A,B,C,D and TS8602A,C Chronotherm III Fuel Saver Thermostats, Installation Instructions, pp. 1-12, 1995.
Honeywell T8602D Chronotherm IV Deluxe Programmable Thermostats, Installation Instructions, pp. 1-12, 2002.
Honeywell TH8000 Series Programmable Thermostats, Owner's Guide, pp. 1-44, 2004.
Honeywell, "Excel Building Supervisor-Integrated R7044 and FS90 Ver. 2.0," Operator Manual, 70 pages, Apr. 1995.
Honeywell, "Installation Guide: Wireless Entry/Exit Remote," 12 pages, 2011.
Honeywell, Wireless Entry/Exit Remote, Operating Manual, 9 pages, 2011.
Honeywell, "Introduction of the S7350A Honeywell WebPAD Information Appliance," Home and Building Control Bulletin, 2 pages, Aug. 29, 2000; Picture of WebPad Device with touch screen, 1 Page; and screen shots of WebPad Device, 4 Pages.
Honeywell, "RedLINK™ Wireless Comfort Systems," RedLINK Wireless Technology, 8 pages, Aug. 2011. 50/1194 PR.
Honeywell, "Total Connect Online Help Guide," Revision A, 800-02577-TC, Mar. 2010.
Honeywell, "Total Connect User Guide," Revision B, 34 pages, May 15, 2012. K14741.
Honeywell, "VisionPRO® 8000 Thermostats," Homeywell International Inc., 2 pages, Downloaded May 24, 2012. http://yourhome.honeywell.com.
Honeywell, "W7006A Home Controller Gateway User Guide," 31 pages, Jul. 2001.
Honeywell, MagicStat® CT3200 Programmable Thermostat, Installation and Programming Instructions, pp. 1-24, 2001.
http://www.cc.gatech.edu/computing/classes/cs6751_94_fall/groupc/climate-2/node1.html, "Contents," 53 pages, printed Sep. 20, 2004.
http://www.ritetemp.info/rtMenu_13.html, Rite Temp 8082, 6 pages, printed Jun. 20, 2003.
http://www.thermostatsales.com, Robertshaw, "9610 Digital Programmable Thermostat," 3 pages, printed Jun. 17, 2004.
http://www.thermostatsales.com, Robertshaw, "9700 Deluxe Programmable Thermostat" 3 pages, printed Jun. 17, 2004.
http://www.thermostatsales.com, Robertshaw, "9710 Deluxe Programmable Thermostat," 3 pages, printed Jun. 17, 2004.
http://www.thermostatsales.com, Robertshaw, "9720 Deluxe Programmable Thermostat," 3 pages, printed Jun. 17, 2004.

(56) References Cited

OTHER PUBLICATIONS http://hunter-thermostats.com/hunter_thetmostats.html, Hunter Thermostat 44668 Specifications, and 44758 Specifications, 2 pages, Printed Jul. 13, 2011.
Hunter, "44200/44250," Owner's Manual, 32 pages, prior to Jul. 7, 2004.
Hunter, "44300/44350," Owner's Manual, 35 pages, prior to Jul. 7, 2004.
Hunter, "Model 44758 Remote Sensor," Owner's Manual, 2 pages, Revision Sep. 4, 2008. Form No. 44044-01.
Hunter, "Auto Saver 550", Owner's Manual Model 44550, 44 pages, prior to Jul. 7, 2004.
Install Guide for Ritetemp Thermostat 8082, 6 pages, 2002.
Invensys™, "9700i 9701i 9715i 9720i Deluxe Programmable Thermostats," User's Manual, pp. 1-28, prior to Jul. 7, 2004.
Larsson, "Battery Supervision in Telephone Exchanges," Ericsson Components AB Sweden, 5 pages, Downloaded May 5, 2012. 9.14.
Lennox, "Network Control Panel (NCP)," User's Manual, 18 pages, Nov. 1999.
Lennox, "Prodigy Control System," Lennox Industries, 4 pages, May 25, 2012. (63W21)-01/11.
Logitech, "Harmony 880 Remote User Manual," v. 1, pp. 1-15, prior to Nov. 30, 2007.
Lux ELV1 Programmable Line Voltage Thermostat, Installation Instructions, 3 pages, prior to Jul. 7, 2004.
Lux TX500 Series Smart Temp Electronic Thermostat, 3 pages, prior to Jul. 7, 2004.
Lux TX9000 Installation, 3 pages, prior to Apr. 21, 2005.
Lux, "9000RF Remote Instructions," 2 pages, prior to Nov. 30, 2007.
Lux, "511 Series Smart Temp Electronic Thermostat," Owner's Manual, 3 pages, prior to Jul. 7, 2004.
Lux, "600 Series Smart Temp Electronic Thermostat," Owner's Manual, 3 pages, prior to Jul. 7, 2004.
Lux, "602 Series Multi-Stage Programmable Thermostat," Owner's Manual, 2 pages, prior to Jul. 7, 2004.
Lux, "605/2110 Series Programmable Heat Pump Thermostat," Owner's Manual, 3 pages, prior to Jul. 7, 2004.
Lux, "700/9000 Series Smart Temp Electronic Thermostat," Owner's Manual, 3 pages, prior to Jul. 7, 2004.
Lux, "PSPH521 Series Programmable Heat Pump Thermostat," Owner's Manual, 3 pages, prior to Jul. 7, 2004.
Lux, "TX1500 Series Smart Temp Electronic Thermostat," Owner's Manual, 6 pages, prior to Jul. 7, 2004.
METASYS, "HVAC PRO for Windows User's Manual," 308 pages, 1998.
Mounting Template for Ritetemp Thermostat 8082, 1 page; 2002.
OMRON Electronic Components, LLC, "Micro Tilt Sensor D6B," Cat. No. JB301-E3-01, 6 pages, Mar. 2005.
OMRON Electronic Components, LLC, "Micro Tilt Sensor D6B," Cat. No. B02WAD1, 2 pages, Jun. 2002.
Operation Manual for Ritetemp Touch Screen Thermostat 8082, 8 pages, 2002.
Proliphix, "Web Enabled IP Thermostats, Intelligent HVAC Control," Proliphix Inc., 2 pages, on or before Aug. 28, 2004.
Proliphix, "Web Enabled IP Thermostats, Ultimate in Energy Efficiency!," Proliphix Inc., 2 pages, on or before Aug. 28, 2004.
Proliphix, Inc., "NT10e & NT20e," 54 pages, on or before Aug. 30, 2005.
Quick Start Guide for Ritetemp Thermostat 8082, 1 page, 2002.
Remote Control Power Requirement for Ritetemp Thermostat 8082, 1 page, 2002.
Ritetemp Operation 8029, 3 pages, Jun. 19, 2002.
Ritetemp Operation 8050, 5 pages, Jun. 26, 2002.
Ritetemp Operation 8085, pp. 1-6, prior to Apr. 21, 2005.
Saravanan et al, "Reconfigurable Wireless Interface for Networking Sensors," IJCSNS International Journal of Computer Science and Network Security, vol. 8 No. 7, pp. 270-276. Revised Jul. 20, 2008.
Screenshot of http://lagotek.com/index.html?currentSection=TouchIt, Lagotek, 1 page, prior to Mar. 29, 2012.
Sealed Unit Parts Co., Inc., Supco & CTC Thermostats . . . loaded with features, designed for value!, 6 pages, prior to Apr. 21, 2005.
Sharp Corporation, "GP1S036HEZ Phototransistor Output, Transmissive Photointerrupter with Tilt Direction (4-Direction) Detecting," pp. 1-11, Oct. 3, 2005.
SmartAC, "Thermostat Programming Web Site Guide," PG-WC-7E, 2 pages, 2009.
Totaline Model P474-1035 Owner's Manual Programmable 5-2 Day Digital Thermostat, pp. 1-21, Apr. 2003.
Totaline Star CPE230RF, Commercial Programmable Thermostat Wireless Transmitter, Owner's Manual, pp. 1-16, Oct. 1998.
Totaline Star P/N P474-0130 Non-Programmable Digital Thermostat Owner's Manual, pp. 1-22, prior to Apr. 21, 2005.
Totaline, "1 for All Programmable Digital Thermostat," Owner's Manual P/N P374-1100FM, 23 pages, Nov. 1998.
Totaline, "1 for All Programmable Digital Thermostat," Owner's Manual P/N P474-1050, 21 pages, Nov. 1998.
Totaline, "1 for All Programmable Digital Thermostat," Owner's Manual P/N P374-1100, 24 pages, Apr. 2001.
Totaline, "Intellistat Combination Temperature and Humidity Control," Owner's Manual P/N P374-1600, 25 pages, Jun. 2001.
Totaline, "P/N P374-0431 Thermostat Remote Control and Receiver," Owner's Manual, 11 pages, prior to Nov. 30, 2007.
Totaline, "P474-1100RF, P474-1100REC Wireless Thermostat," 1 page, prior to Nov. 30, 2007.
Totaline, "Programmable Thermostat Configurable for Advanced Heat Pump or Dual Fuel Operation," Owner's Manual P/N P374-1500, 24 pages, Jun. 1999.
Totaline, "Wireless Remote Sensor, Model P474-0401-1RF/REC," 2 pages, prior to Nov. 30, 2007.
Totaline, "Instructions P/N P474-1010", Manual, 2 pages, Dec. 1998.
Totaline, "Programmable Thermostat", Homeowner's Guide, 27 pages, Dec. 1998.
Totaline, "Wireless Programmable Digital Thermostat," Owner's Manual 474-1100RF, 21 pages, 2000.
Trane, "System Programming, Tracer Summit Version 14, BMTW-SVP01D-EN," 623 pages, 2002.
Trane, "Wireless Zone Sensor. Where Will Wireless Technology Take You?," 4 pages, Feb. 2006.
Travis Industries, Remote Fireplace Thermostat, Part #99300651, 6 pages, printed Feb. 3, 2003.
Trouble Shooting Guide for Ritetemp Thermostat 8082, 1 page, 2002.
Visor Handheld User Guide, 280 pages, Copyright 1999-2000.
Warmly Yours, "Model TH111GFCI-P (120 VAC)," Manual, pp. 1-4, prior to Jul. 7, 2004.
White-Rodgers 1F80-224 Programmable Electronic Digital Thermostat, Installation and Operation Instructions, 8 pages, prior to Apr. 21, 2005.
White-Rodgers Comfort-Set III Thermostat, pp. 1-44, prior to Jul. 7, 2004.
White-Rodgers Installation Instructions for Heating & Air Conditioning IF78 Non-Programmable Thermostat, 6 pages, prior to Apr. 21, 2005.
White-Rodgers Installation Instructions for Heating & Air Conditioning IF78 5/2 Day Programmable Thermostat, 7 pages, prior to Jul. 7, 2004.
White-Rodgers, "Installation Instructions for Heating & Air Conditioning IF72 5/2 Day Programmable Heat Pump Thermostat," 8 pages, prior to Jul. 7, 2004.
White-Rodgers, "Comfort-Set 90 Series Thermostat," Manual, pp. 1-24, prior to Jul. 7, 2004.
White-Rodgers, 1F80-240 "(for Heating Only systems) Programmable Electronic Digital Thermostat," Installation and Operation Instructions, 8 pages, prior to Jul. 7, 2004.
White-Rodgers, 1F80-241 "Programmable Electronic Digital Thermostat," Installation and Operation Instructions, 6 pages, prior to Jul. 7, 2004.
White-Rodgers, 1F80-261 "Programmable Electronic Digital Thermostat," Installation and Operation Instructions, 8 pages, prior to Jul. 7, 2004.

(56) References Cited

OTHER PUBLICATIONS

White-Rodgers, 1F81-261 "Programmable Electronic Digital Multi-Stage Thermostat," Installation and Operation Instructions, 8 pages, prior to Jul. 7, 2004.
White-Rodgers, 1F82-261 "Programmable Electronic Digital Heat Pump Thermostat," Installation and Operation Instructions, 8 pages, prior to Jul. 7, 2004.
White-Rodgers, Comfort-Set 90 Series Premium, 4 pages, prior to Apr. 21, 2005.
www.icmcontrols.com, Simplecomfort, SC3000 Single Stage Heat/Single Stage Cool or Single Stage Heat Pump/Manual Changeover, 1 page, prior to Jul. 7, 2004.
www.icmcontrols.com, Simplecomfort, SC3001 Single Stage Heat/Single Stage Cool or Single Stage Heat Pump/Manual Changeover, 1 page, prior to Jul. 7, 2004.
www.icmcontrols.com, Simplecomfort, SC3006 Single Stage Heat/Single Stage Cool or Single Stage Heat Pump/Manual Changeover, 1 page, prior to Jul. 7, 2004.
www.icmcontrols.com, Simplecomfort, SC3201 2 Stage Heat Pump Manual Changeover, 1 page, prior to Jul. 7, 2004.
www.icmcontrols.com, Simplecomfort, SC3801 2 Stage Heat/2 Stage Cool 2 Stage Heat Pump/Audio Changeover, 1 page, prior to Jul. 7, 2004.

\* cited by examiner

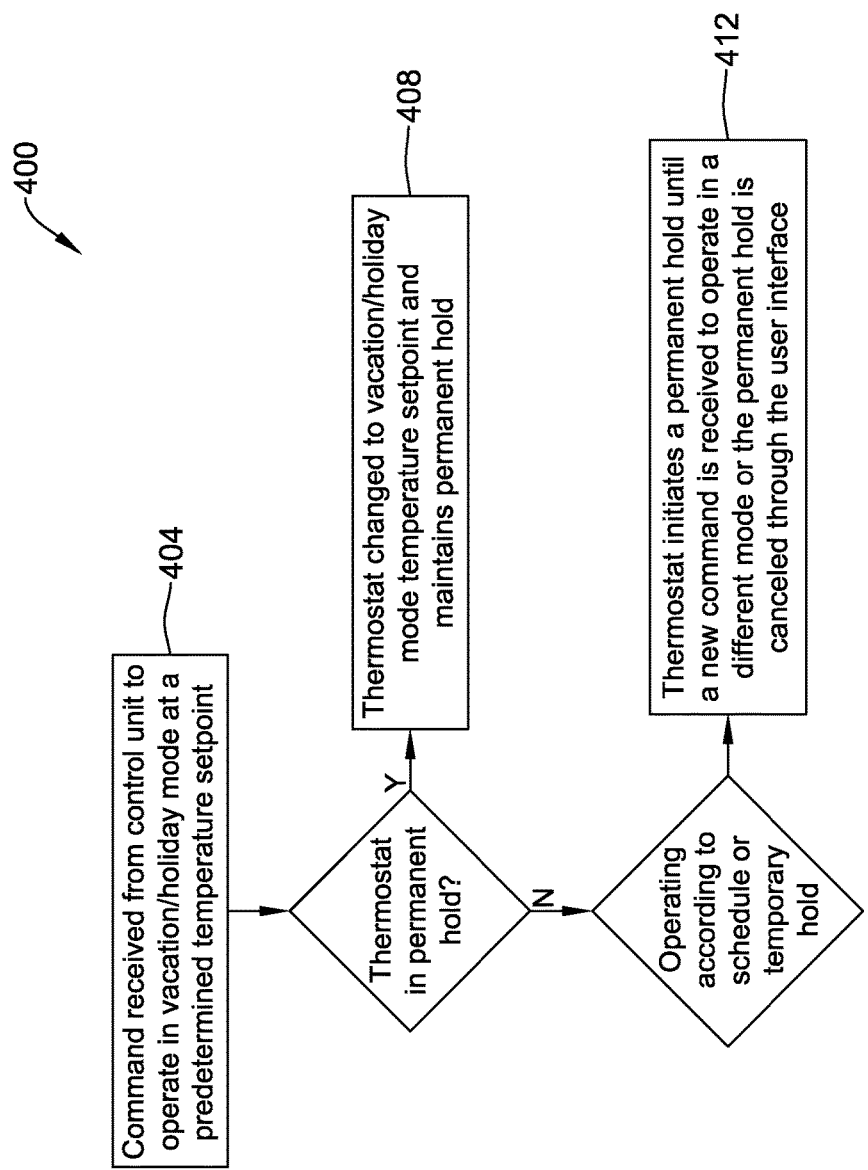

OPERATION OF BUILDING CONTROL VIA REMOTE DEVICE

TECHNICAL FIELD

The present disclosure relates generally to HVAC systems, and more particularly, to controllers that may be used for controlling HVAC systems.

BACKGROUND

Heating, ventilation, and/or air conditioning (HVAC) systems are often used to control the comfort level within a building or other structure. HVAC systems typically include an HVAC controller that controls various HVAC components of the HVAC system in order to affect and/or control one or more environmental conditions within the building. Some HVAC controllers are capable of operating in two or more different operating modes. For example, some HVAC controller may operate in a first operating mode in accordance with a first temperature set point, and a second operating mode in accordance with a second temperature set point. The first operating mode may, for example, operate using an "unoccupied" or "energy savings" temperature set point, and the second operating mode may operate using an "occupied" or "comfort" temperature setting. In some cases, a user interface may be provided that allows a user to program a start and/or end time for each operating mode.

SUMMARY

This disclosure relates generally to HVAC systems, and more particularly, to controllers that may be used for controlling HVAC systems. In some cases, a system for controlling an HVAC system may include a thermostat (or other building controller) and a separate control unit. The separate control unit may be considered a remote control unit, and in some instances, may be in wireless communication with the thermostat via a wireless communication interface. In some instances, the separate control unit may include a connect option (e.g. button), wherein upon selection of the connect option, the separate control unit may enroll the separate control unit with the thermostat and establish the wireless communication interface with the thermostat. In some illustrative embodiments, the thermostat may include a user interface, a memory and a controller. The controller may be programmed to accept a predetermined set point from a user for a selected operating mode entered through the user interface of the thermostat, and may store the predetermined set point in the memory of the thermostat for the selected mode.

The separate control unit may include a housing. In some instances, the housing may include one or more mounting features for mounting the housing to a wall, but this is not required in all embodiments. In some instances, the separate control unit may include a user interface that has at least a first selectable mode option corresponding to a first operating mode of the thermostat, and a second selectable mode option corresponding to a second operating mode of the thermostat. The separate control unit may further include a controller contained within the housing and coupled to the user interface of the separate control unit, where upon selection of the first selectable mode option or the second selectable mode option, the controller of the separate control unit may send a command to the thermostat via the wireless communication interface, commanding the thermostat to operate in the selected operating mode at the corresponding predetermined set point temperature.

In some instances, the thermostat may only have certain operating modes that are active or enabled. Sometimes, the thermostat may only have certain operating modes that are active or enabled during certain periods of time. In either case, and when so provided, when one or more commands are received from the separate control unit that instruct the thermostat to operate in the first operating mode, the thermostat may operate in the first operating mode at a first temperature set point only if the first operating mode is enabled for that thermostat, and when one or more commands are received from the separate control unit that instruct the thermostat to operate in the second operating mode, the thermostat may operate in the second operating mode at a second temperature set point only if the second operating mode is enabled for that thermostat.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various embodiments in connection with the accompanying drawings, in which:

FIGS. 17 and 18 are flow charts showing illustrative methods that may be used by the HVAC controllers of FIGS. 2 and 3 when interacting with the control unit of FIGS. 4-6.

Figure 1:
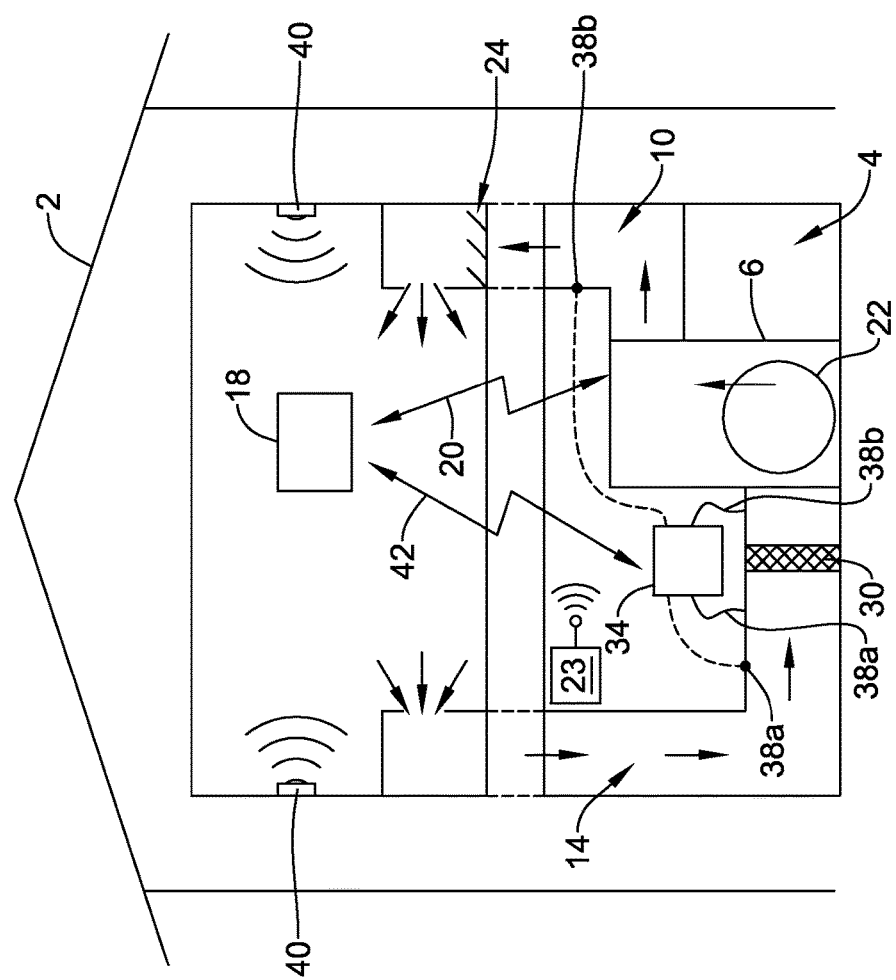
FIG. 1 is a schematic view of an illustrative HVAC system servicing a building or structure.

While the disclosure is amenable to various modifications and alternative forms, specifics thereof have been shown by way of example in the drawings and will be described in detail. It should be understood, however, that the intention is not to limit aspects of the disclosure to the particular embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The description and drawings show several embodiments which are meant to be illustrative in nature.

FIG. 1 is a schematic view of a building 2 having an illustrative heating, ventilation, and air conditioning (HVAC) system 4. While FIG. 1 shows a typical forced air type HVAC system, other types of HVAC systems are contemplated including, but not limited to, boiler systems, radiant heating systems, electric heating systems, cooling systems, heat pump systems, and/or any other suitable type of HVAC system, as desired. The illustrative HVAC system 4 of FIG. 1 includes one or more HVAC components 6, a system of ductwork and air vents including a supply air duct 10 and a return air duct 14, and at least one HVAC controller 18. The one or more HVAC components 6 may include, but are not limited to, a furnace, a heat pump, an electric heat pump, a geothermal heat pump, an electric heating unit, an air conditioning unit, a humidifier, a dehumidifier, an air exchanger, an air cleaner, a damper, a valve, and/or the like.

It is contemplated that the HVAC controller(s) 18 may be configured to control the comfort level in the building or structure by activating and deactivating the HVAC component(s) 6 in a controlled manner. The HVAC controller(s) 18 may be configured to control the HVAC component(s) 6 via a wired or wireless communication link 20. The HVAC controller(s) may wirelessly communicate with the one or more HVAC components(s) 6 following a wireless protocol such as, for example, cellular communication, ZigBee®, Bluetooth®, WiFi®, IrDA®, dedicated short range communication (DSRC), EnOcean®, or any other suitable wireless protocols, as desired.

In some cases, the HVAC controller(s) 18 may be a thermostat, such as, for example, a wall mountable thermostat, but this is not required in all embodiments. Such a thermostat may include (e.g. within the thermostat housing) or have access to a temperature sensor for sensing an ambient temperature at or near the thermostat. In some instances, the HVAC controller(s) 18 may be a zone controller, or may include multiple zone controllers each monitoring and/or controlling the comfort level within a particular zone in the building or other structure.

An illustrative HVAC controller, which is not meant to be limiting in any way, is disclosed in: US Published Patent Application No. 20090140062, entitled "HVAC CONTROLLER THAT SELECTIVELY REPLACES OPERATING INFORMATION ON A DISPLAY WITH SYSTEM STATUS INFORMATION"; US Published Application No. 20090143880, entitled "HVAC CONTROLLER WITH CONTEXT SENSITIVE HELP SCREENS"; US Published Application No. 20090143918, entitled "METHOD AND APPARATUS FOR CONFIGURING AN HVAC CONTROLLER"; US Published Application No. 20090143916, entitled "HVAC CONTROLLER HAVING A PARAMETER ADJUSTMENT ELEMENT WITH A QUALITATIVE INDICATOR"; US Published Application No. 20090143879, entitled "HVAC CONTROLLER WITH PARAMETER CLUSTERING"; US Published Application No. 20090140056, entitled "HVAC CONTROLLER WITH QUICK SELECT FEATURE," the entireties of which are incorporated herein by reference for all purposes.

In the illustrative HVAC system 4 shown in FIG. 1, the HVAC component(s) 6 may provide heated air (and/or cooled air) via the ductwork 10 throughout the building 2. As illustrated, the HVAC component(s) 6 may be in fluid communication with every room and/or zone in the building 2 via the ductwork 10 and 14, but this is not required. In operation, when a heat call signal is provided by the HVAC controller(s) 18, an HVAC component 6 (e.g. forced warm air furnace) may be activated to supply heated air to one or more rooms and/or zones within the building 2 via supply air ducts 10. The heated air may be forced through supply air duct 10 by a blower or fan 22. In this example, the cooler air from each zone may be returned to the HVAC component 6 (e.g. forced warm air furnace) for heating via return air ducts 14. Similarly, when a cool call signal is provided by the HVAC controller(s) 18, an HVAC component 6 (e.g. air conditioning unit) may be activated to supply cooled air to one or more rooms and/or zones within the building or other structure via supply air ducts 10. The cooled air may be forced through supply air duct 10 by the blower or fan 22. In this example, the warmer air from each zone may be returned to the HVAC component 6 (e.g. air conditioning unit) for cooling via return air ducts 14. In some cases, the HVAC system 4 may include an optional communications gateway or other device 23 that may allow one or more of the HVAC components 6, as described herein, to communicate wirelessly with one another in accordance with a wireless communications protocol such as, for example, cellular communication, ZigBee®, Bluetooth®, WiFi®, IrDA®, dedicated short range communication (DSRC), EnOcean®, or any other suitable wireless protocols, as desired. In some cases, the communications gateway 23 may facilitate communication between the various HVAC components 6 over a local area network (LAN), a wide area network (WAN), or the internet. These are just some examples.

In some cases, the system of vents or ductwork 10 and/or 14 can include one or more dampers 24 to regulate the flow of air, but this is not required. For example, one or more dampers 24 may be coupled to one or more HVAC controller(s) 18, and can be coordinated with the operation of one or more HVAC components 6. The one or more HVAC controller(s) 18 may actuate dampers 24 to an open position, a closed position, and/or a partially open position to modulate the flow of air from the one or more HVAC components 6 to an appropriate room and/or zone in the building or other structure. The dampers 24 may be particularly useful in zoned HVAC systems, and may be used to control which zone(s) receives conditioned air from the HVAC component(s) 6.

In many instances, one or more air filters 30 may be used to remove dust and other pollutants from the air inside the building 2. In the illustrative example shown in FIG. 1, the air filter(s) 30 is installed in the return air duct 14, and may filter the air prior to the air entering the HVAC component 6, but it is contemplated that any other suitable location for the air filter(s) 30 may be used. The presence of the air filter(s) 30 may not only improve the indoor air quality, but may also protect the HVAC components 6 from dust and other particulate matter that would otherwise be permitted to enter the HVAC component.

In some cases, and as shown in FIG. 1, the illustrative HVAC system 4 may include an equipment interface module (EIM) 34. When provided, the equipment interface module 34 may be configured to measure or detect a change in a given parameter between the return air side and the discharge air side of the HVAC system 4. For example, the equipment interface module 34 may be adapted to measure a difference in temperature, flow rate, pressure, or a combination of any one of these parameters between the return air side and the discharge air side of the HVAC system 4. In some cases, the equipment interface module 34 may be adapted to measure the difference or change in temperature (delta T) between a return air side and discharge air side of the HVAC system 4 for the heating and/or cooling mode. The delta T for the heating mode may be calculated by subtracting the return air temperature from the discharge air temperature (e.g. delta T=discharge air temp.-return air temp.). For the cooling mode, the delta T may be calculated by subtracting the discharge air temperature from the return air temperature (e.g. delta T=return air temp.-discharge air temp.).

When provided, the equipment interface module 34 may be configured to communicate with the HVAC controller 18 via, for example, a wired or wireless communication link 42. In other cases, the equipment interface module 34 may be incorporated or combined with the HVAC controller 18. In either cases, the equipment interface module 34 may communicate, relay or otherwise transmit data regarding the selected parameter (e.g. temperature, pressure, flow rate, etc.) to the HVAC controller 18. In some cases, the HVAC controller 18 may use the data from the equipment interface module 34 to evaluate the system's operation and/or performance. For example, the HVAC controller 18 may compare data related to the difference in temperature (delta T) between the return air side and the discharge air side of the HVAC system 4 to a previously determined delta T limit stored in the HVAC controller 18 to determine a current operating performance of the HVAC system 4.

In some cases, the equipment interface module 34 may include a first temperature sensor 38a located in the return (incoming) air duct 14, and a second temperature sensor 38b located in the discharge (outgoing or supply) air duct 10. Alternatively, or in addition, the equipment interface module 34 may include a differential pressure sensor including a first pressure tap 39a located in the return (incoming) air duct 14, and a second pressure tap 39b located downstream of the air filter 30 to measure a change in a parameter related to the amount of flow restriction through the air filter 30. In some cases, the equipment interface module 34, when provided, may include at least one flow sensor that is capable of providing a measure that is related to the amount of air flow restriction through the air filter 30. In some cases, the equipment interface module 34 may include an air filter monitor. These are just some examples.

The HVAC system 4 may also include one or more control units 40 that are adapted to communicate with, for example, the at least one HVAC controller 18. In some cases, the one or more control units 40 may be adapted to communicate with equipment interface module (EIM) 34 or any other suitable building control device, as desired. In any event, the one or more control units 40 may be mounted to a wall of the building or structure at a location that is remote from the HVAC controller(s) 18 (or other suitable building control device), and may sometimes be referred to as an entry/exit remote control unit. In some cases, the one or more control units 40 may be configured to send commands to the HVAC controller 18 via a one-way, wired or wireless communication link. In other cases, the one or more control units 40 may be configured to send and/or receive commands to and from the HVAC controller 18 via a two-way, wired or wireless communication link. The communication link established between the control units 40 and the one or more HVAC controllers 18 may be a direct communication link, or alternatively, an indirect communication link where communication between the control units 40 and the one or more HVAC controllers 18 is routed through a communications device such as, for example, communications gateway 23.

Figure 2:
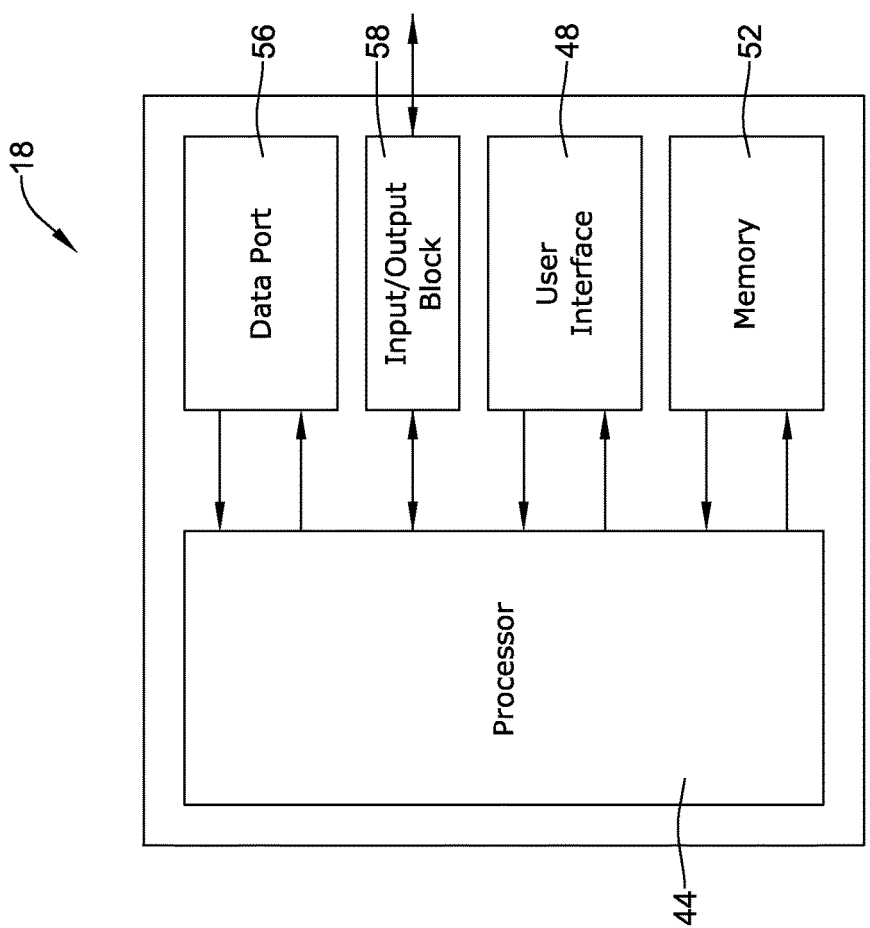
FIG. 2 is a schematic view of an illustrative HVAC controller.

FIG. 2 is a schematic view of an illustrative HVAC controller 18. In some instances, HVAC controller 18 may be a thermostat, but this is not required. In the illustrative embodiment of FIG. 2, HVAC controller 18 includes a processor (e.g. microprocessor, microcontroller, etc.) 44, a user interface 48, and a memory 52. In some cases, the HVAC controller 18 may optionally include an input/output block (I/O block) 58 for receiving one or more signals from the HVAC system 4 and/or for providing one or more control signals to the HVAC system 4. For example, the I/O block 58 may communicate with one or more HVAC components 6 of the HVAC system 4. Additionally, in some cases, the I/O block 58 may communicate with a control unit 40. Still, alternatively, or in addition, the I/O block 58 may communicate with another controller, which is in communication with one or more HVAC components 6 of the HVAC system 4, such as a zone control panel in a zoned HVAC system, equipment interface module (EIM) 34 or any other suitable building control device. In some cases, I/O block 58 may establish a wired or wireless communication link to one or more of the control units 40.

The processor 44 may operate in accordance with an algorithm that controls or at least partially controls one or more HVAC components 6 of an HVAC system such as, for example, HVAC system 4 shown in FIG. 1. The processor 44 may, for example, operate in accordance with an algorithm that provides temperature set points, starting and/or ending times, and the like. In some cases, the processor 44 may operate according to a first operating mode having a first temperature set point, a second operating mode having a second temperature set point, a third operating mode having a third temperature set point, and/or the like. In some cases, the first operating mode may correspond to an occupied mode and the second operating mode may correspond to an unoccupied mode. In some cases, the third operating mode may correspond to a holiday or vacation mode wherein the building or structure 2 may be unoccupied for an extended period of time. In other cases, the third operating mode may correspond to a sleep mode wherein the building occupants are either asleep or inactive for a period of time. These are just some examples. It will be understood that the processor 44 may be capable of operating in additional modes as necessary or desired. Additionally, in some cases, HVAC controller 18 may include a timer (not shown). The timer may be integral to the processor 44 or may be provided as a separate component.

In the illustrative embodiment of FIG. 2, user interface 48 may be any suitable use interface that permits HVAC controller 18 to display and/or solicit information, as well as accept one or more user interactions with the HVAC controller 18. For example, the user interface 48 may permit a user to enter data such as temperature set points, humidity set points, starting times, ending times, diagnostic limits, conditions under which diagnostic limits may be suspended, responses to alerts, and the like. Additionally, as will be described in greater detail below, the HVAC controller 18 may be configured to allow a user to enable and/or disable each of the first operating mode, the second operating mode and/or the third operating mode via the user interface 48. In some cases, each of the different operating modes may be enabled and/or disabled independent of one another such that when a selected mode is enabled or disabled it does not affect whether or not the additional available operating modes are enabled or disabled.

In some cases, user interface 48 may include a display and a distinct keypad. A display may be any suitable display. In some instances, a display may include or may be a liquid crystal display (LCD), and in some cases a fixed segment display or a dot matrix LCD display. If desired, user interface 48 may be a touch screen LCD panel that functions as both display and keypad. In some instances, a touch screen LCD panel may be adapted to solicit values for a number of operating parameters and/or to receive such values, but this is not required.

The memory 52 of the illustrative HVAC controller 18 may be in communication with the processor 44. Memory 52 may be used to store any desired information, such as the aforementioned control algorithm, set points, schedule times, diagnostic limits such as, for example, differential pressure limits, delta T limits, and the like. Memory 52 may be any suitable type of storage device including, but not limited to, RAM, ROM, EPROM, flash memory, a hard drive, and/or the like. In some cases, processor 44 may store information within memory 52, and may subsequently retrieve the stored information.

In some cases, as illustrated in FIG. 2, HVAC controller 18 may include a data port 56. Data port 56 may be a wireless port such as a Bluetooth™ port or any other wireless protocol. In other cases, data port 56 may be a wired port such as a serial port, a parallel port, a CAT5 port, a USB (universal serial bus) port, and/or the like. In some instances, data port 56 may be a USB port and may be used to download and/or upload information from a USB flash drive or some other data source. Other remote devices may also be employed, as desired.

Data port 56 may be configured to communicate with processor 44 and may, if desired, be used to upload information to processor 44 and/or download information from processor 44. Information that can be uploaded and/or downloaded may include, for example, values of operating parameters. In some instances, data port 56 may be used to upload a previously-created thermostat configuration into HVAC controller 18, thereby hastening the programming process. In some cases, data port 56 may be used to download a thermostat configuration that has been created using HVAC controller 18, so that the thermostat configuration may be transferred to other similar thermostats, hastening their programming process. In some cases, data port 56 may be used to upload and/or download information pertaining to an HVAC dealer or contractor, if desired. In some cases, data port 56 may be used to download data stored within the memory 52 for analysis. For example, data port 56 may be used to download a faults and/or alerts log or parts thereof to a remote device such as a USB memory stick (also sometimes referred to as a thumb drive or jump drive), personal computer, laptop, iPAD® or other tablet computer, PDA, smart phone, or other remote device, as desired. In some cases, the data may be convertible to an MS EXCEL®, MS WORD®, text, XNL, and/or Adobe PDF® file, but this is certainly not required.

Figure 3:
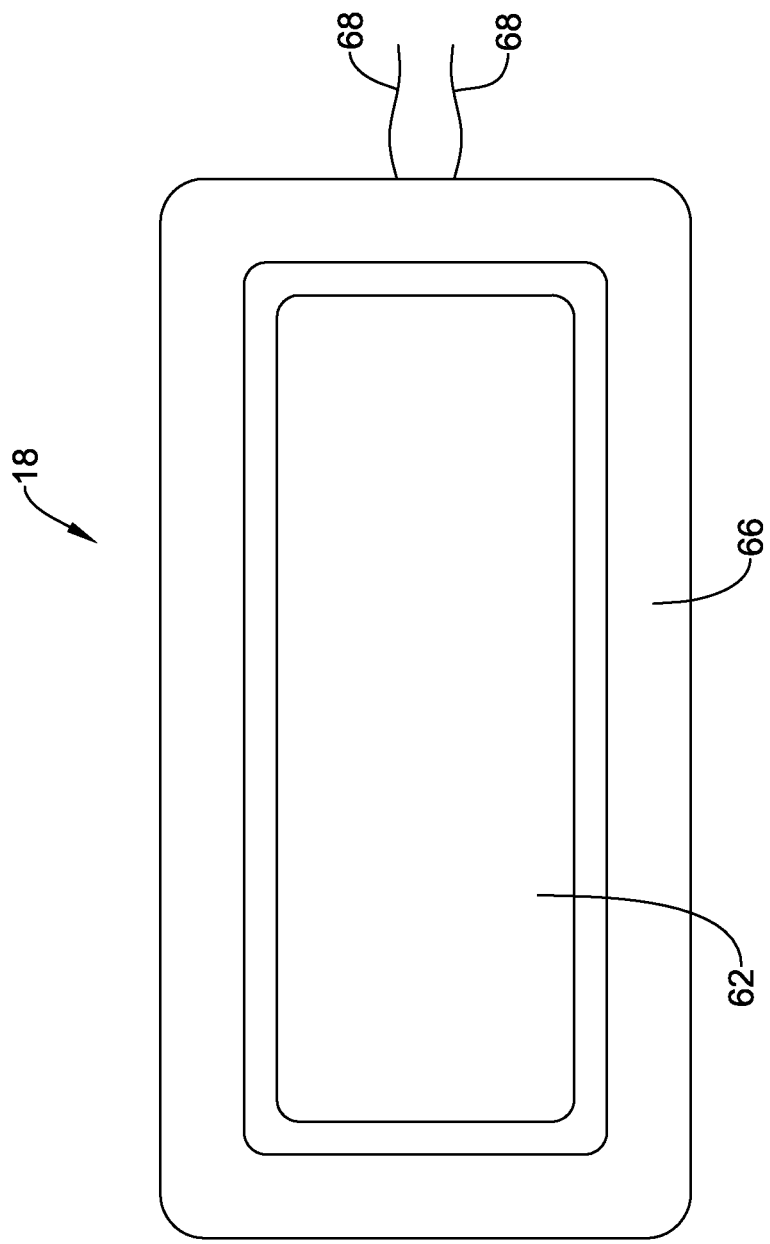
FIG. 3 is a front view of an illustrative HVAC controller.

FIG. 3 is a front view of an illustrative HVAC controller 18. In some cases, HVAC controller 18 may be configured to provide substantial display and/or programming functionality. In the illustrative embodiment of FIG. 3, HVAC controller 18 may include a display 62 that is disposed within a housing 66 but viewable externally from the housing 66. In some cases, display 62 may be a touch screen LCD display. If desired, display 62 may be a dot matrix touch screen LCD display. A dot matrix touch screen LCD display is a touch screen LCD that permits images such as letters, numbers, graphics, images, and the like to be displayed anywhere on the LCD, rather than being confined to predetermined locations such as is the case with a fixed segment type of LCD display. Housing 66 may be formed of any suitable material, such as a polymeric material. In some cases, the housing 66 may be formed such that it defines a data port 56 (see FIG. 2). In some cases, the housing 66 may also include suitable wiring and/or other electrical connections 68 such that the HVAC controller 18 may be electrically coupled to the HVAC system 4.

Figure 4:
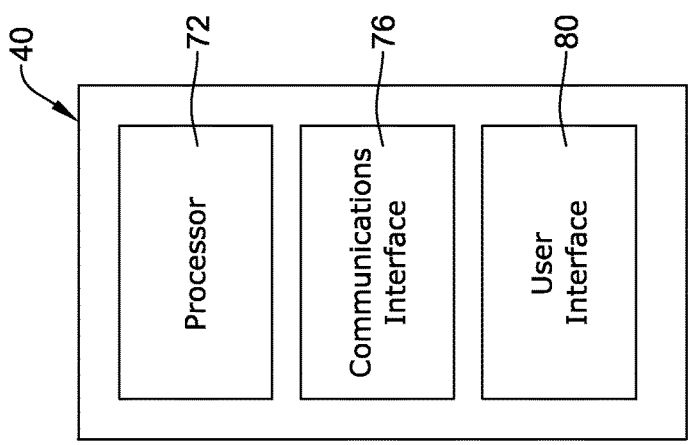
FIG. 4 is a schematic view of an illustrative control unit for use with an HVAC controller.

FIG. 4 is a schematic view of an exemplary control unit 40 that is adapted to communicate with one or more HVAC controller(s) such as, for example, the illustrative HVAC controller 18 of FIGS. 2 and 3. In the illustrative embodiment, the control unit 40 includes a processor (e.g. microprocessor, microcontroller, etc.) 72, a communications interface 76, and a user interface 80.

The processor 72 of the control unit 40 may be configured to send one or more commands to the at least one HVAC controller 18 via I/O block 58 that command the at least one HVAC controller 18 to operate in a first mode having a corresponding first temperature set point, a second mode having a corresponding second temperature set point, a third mode having a corresponding third temperature set point, and the like. In some cases, the first operating mode may correspond to an occupied mode of the at least one HVAC controller 18, and the second operating mode may correspond to an unoccupied mode of the at least one HVAC controller 18. In some cases, the third operating mode may correspond to a holiday or vacation mode of the at least one HVAC controller wherein the building or structure 2 may be unoccupied for an extended period of time. In other cases, the third operating mode may correspond to a sleep mode wherein the building occupants are either asleep or inactive for a period of time. These are just some examples operating modes. It will be understood that the HVAC controller 18 may be capable of operating in additional modes as necessary or desired.

The communications interface 76 may be used to establish a communication link with the at least one HVAC controller 18, as described herein. It is contemplated that the communication link established between the HVAC controller 18 and the control unit 40 may be a wired or wireless communication link, sometimes between the communications interface 76 of the control unit 40 and the I/O block 58 of the HVAC controller 18. In some cases, the communications interface 76 of the control unit 40 may be a wireless transmitter for wirelessly transmitting a signal to the HVAC controller 18. In other cases, communications interface 76 of control unit 40 may be a wireless transmitter/receiver for wireless sending and/or receiving signals to and from the HVAC controller 18 via the established communication link.

The user interface 80 of the control unit 40 may be any suitable user interface that facilitates interaction between a user and the control unit 40. In many cases, the user interface 80 may be configured to accept one or more user interactions. For example, the user interface 80 may include one or more selectable options and/or a display for displaying information to a user. In some cases, the user interface 80 may include a touch screen display with one or more selectable icons for selection by a user appearing on the display. In other cases, the user interface 48 may include a fixed segment display or a liquid crystal display that is provided separately from one or more selectable options or buttons that are available for selection by a user. In still other cases, the user interface 48 may not include a display unit, and may only include one or more selectable options or buttons that are available for selection by a user.

Figure 5:
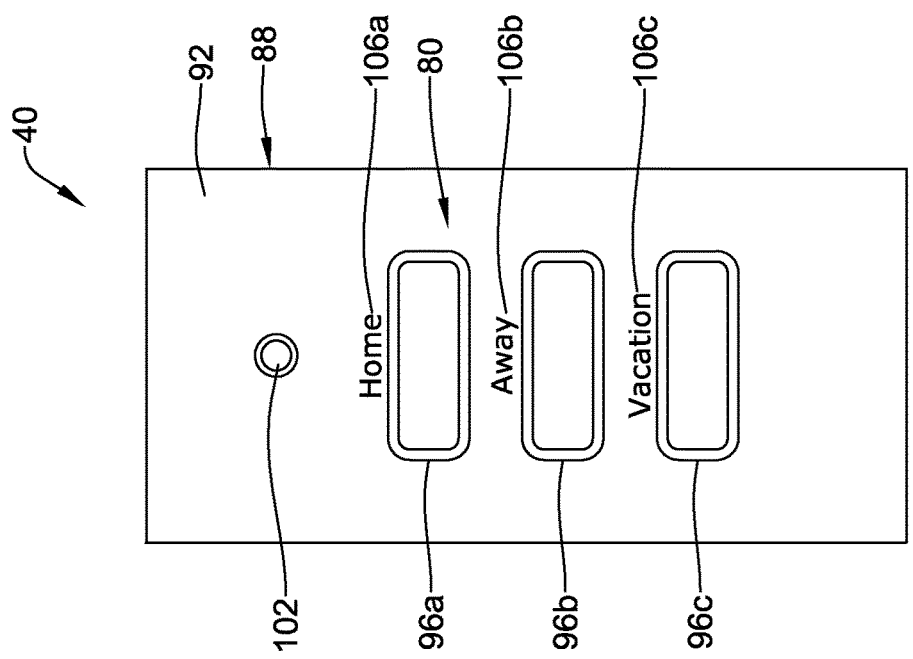
FIG. 5 is a front view of an illustrative control unit for use with an HVAC controller.

FIG. 5 is a front view of an exemplary control unit 40. As shown in FIG. 5, the control unit 40 may include a housing 88 having a housing cover 92. In addition, the control unit 40, as shown in the illustrative example of FIG. 5, may include a user interface generally shown at 80 that includes one or more individually selectable buttons 96a, 96b, 96c, and an indicator light 102 (e.g. LED). Each of the selectable buttons 96a, 96b, and 96c may correspond to a different operating mode of the HVAC controller 18. For example, the first button 96a may correspond to a first operating mode having a first temperature set point, the second button 96b may correspond to the second operating mode having a second temperature set point, and the third button 96c may correspond to a third operating mode having a third temperature set point. In some cases, each of the buttons 96a, 96b and 96b may include an identifying label 106a, 106b and 106c printed, engraved or embossed directly on, above, or below the button 96a, 96b, and/or 96c to which the identifying label corresponds. For example, first button 96a may include the identifying label 106a "Home," second button 96b may include the identifying label "Away," and third button 96c may include the identifying label "Vacation." Other identifying labels may include "Occupied," "Unoccupied," "Holiday," "Sleep," and the like. These are just some example labels.

The indicator light 102 may be a Light Emitting Diode (LED), but this is not required. The indicator light 102, when provided, may be adapted to change colors and/or flash. For example, the indicator light 102 may be adapted to flash or rapidly blink on and off when a user selects one of the first button 96a, second button 96b, and/or third button 96c.

Figure 6:
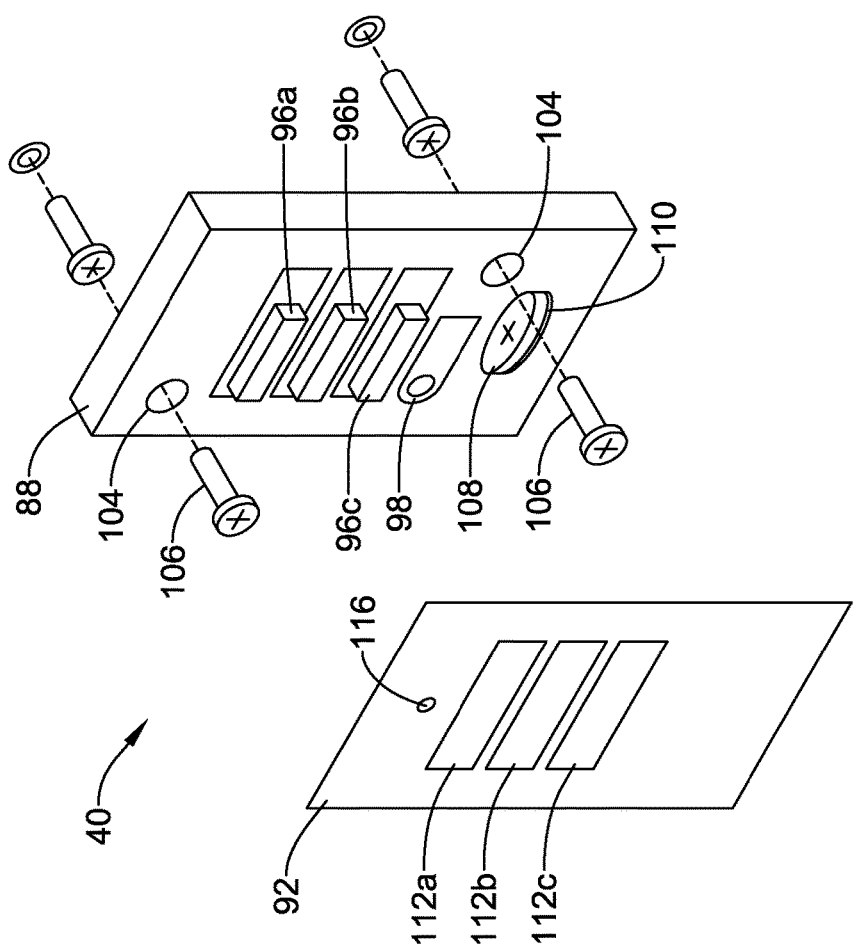
FIG. 6 is an exploded view of the illustrative control unit of FIG. 5.

FIG. 6 is an exploded view of the control unit 40 of FIG. 5, showing the cover 92 removed from the housing 88. The housing 88 and the cover 92 may be formed of any suitable material, such as a polymeric material. In some cases, the housing 88 may be formed such that it defines or holds each of the buttons 96a, 96b and 96c. The housing 88 may include an additional button 98, which in the illustrative embodiment, is not visible to the user until the cover 92 is removed from the housing 88. The button 98 may be a "connect" button 98 that, when selected by a user, causes the control unit 40 to broadcast a signal to the one or more HVAC controllers 18, commanding the one or more HVAC controllers 18 to recognize and enroll the control unit 40, thereby establishing a communication link between the control unit 40 and the corresponding HVAC controllers 18.

In some cases, the indicator light 102 may flash or remain yellow until the control unit 40 is enrolled with each of the one or more available HVAC controllers 18, and a communication link is established between the one or more HVAC controllers 18 and the control unit 40. The indicator light 102 may cease flashing or may turn color from yellow to green once the control unit 40 is enrolled with each of the one or more available HVAC controllers 18 and/or once a communication link is established between the control unit 40 and the one or more HVAC controllers 18. In some cases, the indicator light 102 may form at least a portion of the connect button 98, but this is not required.

In some instances, the housing 88 may include one or more features for mounting the housing 88 to a wall or other suitable surface of the building or structure. The features may be formed integrally with the housing 88 or may be provided separate from the housing 88. In some cases, as shown, the housing 88 may include one or more holes or apertures 104 for receiving at least a part of one or more fasteners 106 for securing the housing 88 to a wall or other suitable surface of the building or structure. Exemplary fasteners may include screws, nails, bolts, wall anchors, and the like.

The housing 88 may also include suitable wiring and/or other electrical connections such that the control unit 40 may be electrically wired into a power source and/or be in electrical communication with one or more HVAC controllers 18 via a wired communication link. In other cases, regardless of whether or not the communication link between the control unit and the one or more HVAC controllers 18 is a wired or wireless link, the housing 88 may include a battery compartment 108 for housing at least one battery 110. The at least one battery 110 may be used to provide primary power and/or backup power to the control unit 40, as desired.

In the example shown in FIG. 6, the cover 92, when provided, may include one or more slots or windows 112a, 112b, 112c through which the buttons 96a, 96b, 96c may be viewable and accessible to a user. Additionally, the cover 92 may include an additional window 116 through which the indicator light 102 is visible to the user. The cover 92 may be secured to the housing 88 via friction fit, a snap fit, one or more pairs of mating connectors, or in any other suitable manner. The cover 92 may be removable such that the at least one battery 110 may be replaced when the battery power runs low.

It is contemplated that the control unit 40, such as described above, may be installed at a point of entry to a building or structure for the user's convenience. In some cases, more than one remote control unit 40 may be located throughout the building, such as at different points of entry to the building or structure or at other locations such as in a bed room.

In some cases, the control unit 40 may be mounted to a wall near an entry way or door where a user may enter and/or exit the building. During use, the user may select a button such as, for example, button 96a, 96b, or 96c corresponding to a desired operating mode of the HVAC system 4, having a predetermined set point, when entering or leaving the building. The control unit 40 may send a signal to the HVAC controller(s) 18 commanding the HVAC controller(s) 18 to operate in the selected mode at the corresponding set point.

In some instances, a control unit 40 may be installed at the same time as the HVAC controller(s) 18 (e.g. new installation). In other instances, the control unit 40 may be installed in a building or structure that has an existing HVAC controller(s) 18 (e.g. post-installation). In either case, a communication link may need to be established between the control unit 40 and the HVAC controller(s) 18 so that the control unit 40 may send commands to the HVAC controller(s) 18.

In some instances, a communication link between the control unit 40 and the HVAC controller 18 may be established by selecting the connect button 98 that provided on the control unit 40 (FIG. 6). Selection of the connect button 98 may cause the control unit 40 to send a signal to the one or more existing HVAC controllers 18, commanding the one or more HVAC controllers 18 to recognize and enroll the control unit 40 as part of the HVAC system 4, establishing a communication link between the control unit 40 and the one or more HVAC controllers 18. The communication link may be a one-way communication link or a two-way communication link.

Figure 7:
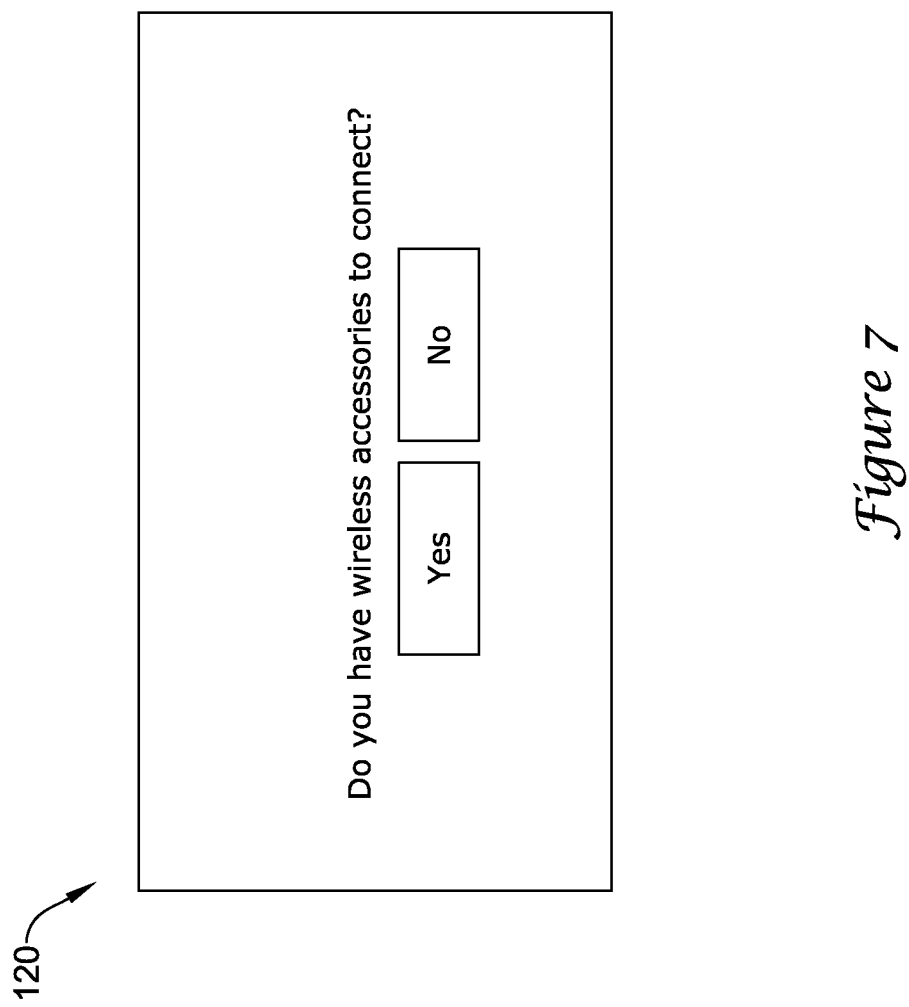
FIGS. 7-16 show several illustrative screens that may be displayed on the HVAC controllers of FIGS. 2 and 3 when in use.
Figure 8:
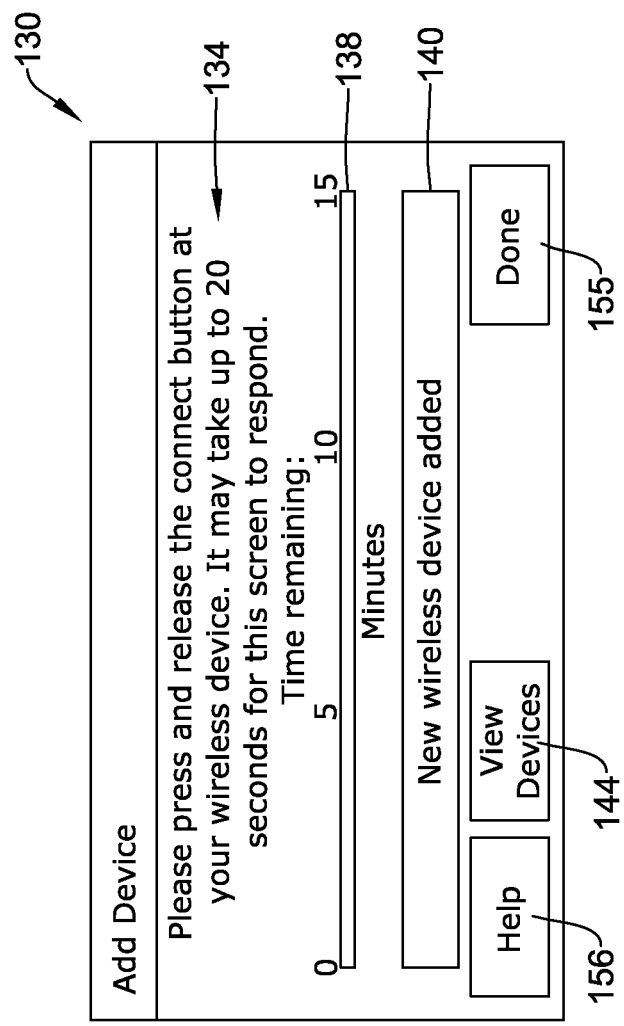
Figure 9:
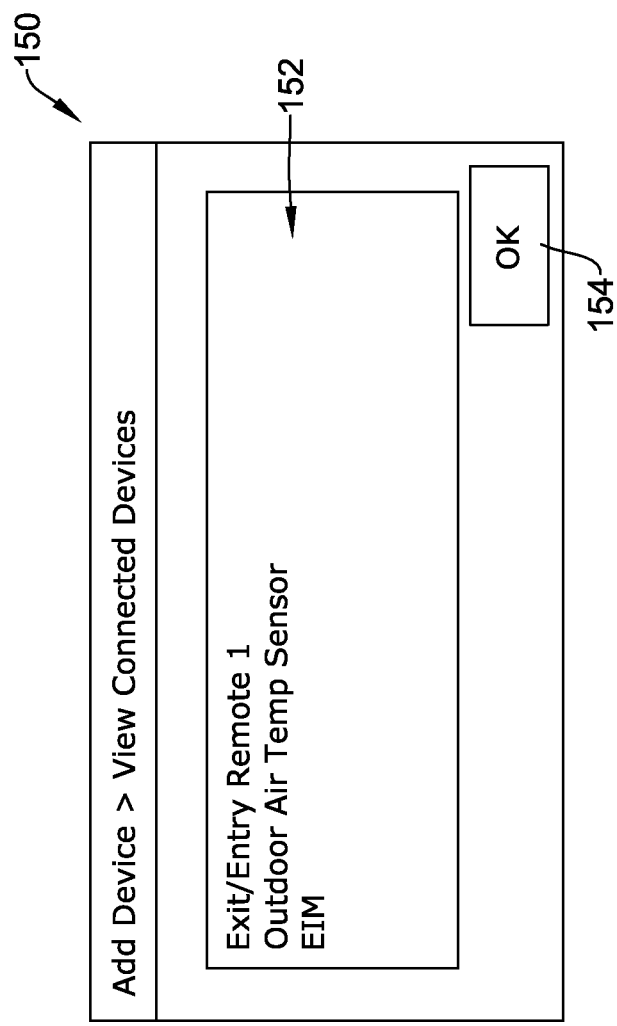

In some cases, the HVAC controller may display one or more screens on the display 62 of the user interface 48 that may guide a user through establishing a communication link between the HVAC controller 18 and the control unit 40. FIGS. 7-9 show several illustrative screens that may be displayed on the display 62 of an exemplary HVAC controller 18 during set-up of the HVAC controller 18 with a control unit 40. In some cases, during set-up of the HVAC controller 18, the HVAC controller 18 may display a user query screen 120 that queries the user about any wireless accessories such as, for example, control unit 40, which may need to be connected to the HVAC controller 18. User query screen 120 may include one or more options for responding. For example, as shown in FIG. 7, user query screen 120 may include a first option 124 labeled "Yes" and second option 126 labeled "No." Selection of the first option 124 labeled "Yes" may cause the HVAC controller 18 to subsequently display a connection prompt screen 130, as shown in FIG. 8, which may prompt the user to take a certain action to facilitate connection of a selected wireless device (e.g. control unit 40) with the HVAC controller 18.

With reference to FIG. 8, and in some cases, connection prompt screen 130 may include a first user message 134 that instructs the user to press and release a connect button (e.g. connect button 98 of FIG. 6) at the wireless device (e.g. control unit 40). Additional information that may be useful to the user may be optionally included within the user message 134. In some cases, connection prompt screen 130 may include a status bar 138 that may display the amount of time that has lapsed since connection between the HVAC controller 18 and the wireless device (e.g. control unit 40) was attempted, however, this is not required. Upon successful connection of the HVAC controller 18 with the wireless device (e.g. control unit 40), the HVAC controller 18 may display a second user message 140 on the connection prompt screen 130, indicating that a new wireless device (e.g. control unit 40) has been added. In some cases, and when provided, the second user message 140 may be displayed on another subsequent screen, on a pop-up screen, or any in other suitable manner, as desired.

In some cases, connection prompt screen 130 may include an option 144 that, when selected, may cause the HVAC controller 18 to display a screen 150 as shown in FIG. 9, which may display a list of devices 152 that are currently enrolled with the HVAC controller 18. In FIG. 9, three devices are shown. Selection of button 154 labeled "OK in FIG. 9 may cause the HVAC controller 18 to return to displaying the connection prompt screen 130.

Figure 10:
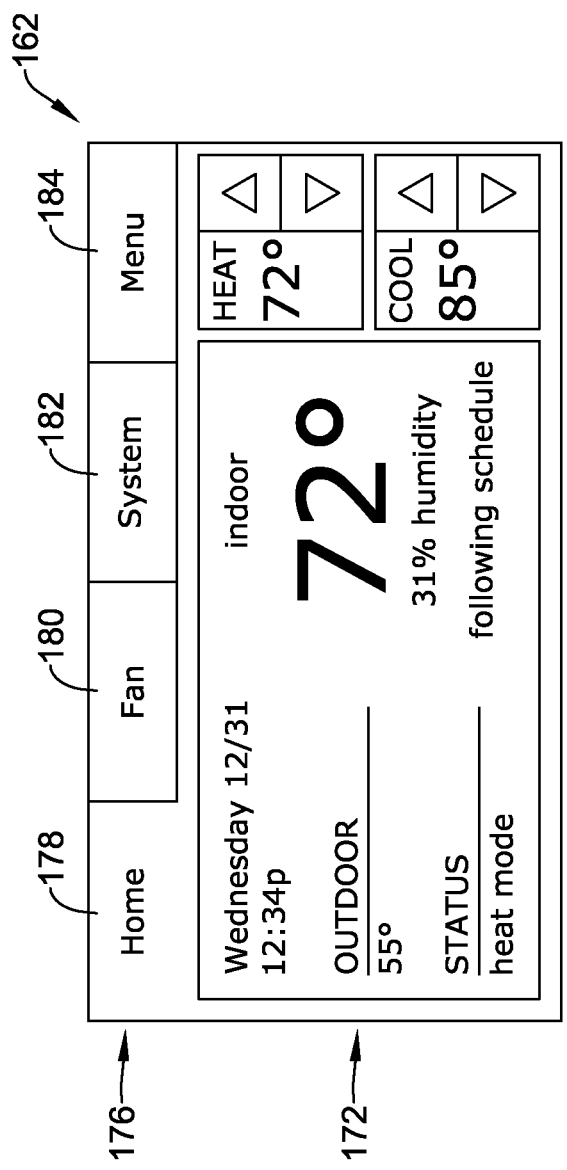

Connection prompt screen 130 may also include a button 156 labeled "Help" that, when selected, may cause the HVAC controller 18 to display additional information about the connection prompt screen 130 that may be helpful to a user. In some cases, selection of the button 155 labeled "Done" or "Finished" may cause the HVAC controller 18 to display additional screens related to setting up the HVAC controller 18. In other cases, selection of the "Done" button 155 may cause the HVAC controller 18 to display a home screen such as shown in FIG. 10, and as discussed in greater detail below. It will be understood that a similar set of screens may be displayed for any wired accessories needing connection to the HVAC controller 18, if desired.

Regardless of when the control unit 40 is added to the HVAC system 4, the user may need to configure the HVAC controller 18 such that it is adapted to communicate with and send and/or receive commands from the control unit 40. FIGS. 10-15 show several illustrative screens that may be displayed on the user interface of an exemplary HVAC controller 18. In cases where multiple HVAC controllers 18 are present such as, for example, in a zoned HVAC system, each of the different HVAC controllers 18 may be configured to interact with the control unit 40 in the same or different manner. For example, each of the HVAC controllers 18 may be configured to respond the same to a command to operate in a first mode, a second mode and/or a third mode. In other cases, each for the HVAC controllers 18 may be configured to respond differently to a command from the control unit 40 to operate in a first mode, a second mode and/or a third mode. For example, a first HVAC controller 18 may respond to a command to operate in a first mode at a first temperature, a second HVAC controller may respond to the command to operate in a first mode at a different temperature than the first temperature, and third controller may not respond to the command to operate in the first mode, but may instead continue to follow a predetermined operating schedule. This is just one example.

FIG. 10 is an example of a home screen 172 that may be displayed by an HVAC controller 18 on its display 62 when no data entry is underway for a period of time or, in some cases, after a user has pushed a HOME button 178. In many cases, the illustrative home screen 172 of FIG. 10 may include a navigational bar 176 along the top. Navigational bar 176 may be considered as providing top level navigation. In some cases, if desired, navigational bar 176 may include a HOME button 178, a FAN button 180, a SYSTEM button 182 and/or a MENU button 184. In the illustrative embodiment, the user may access one or more menus from which the user may make a temperature set point change, a humidity set point change, an indoor air quality change, a programmable schedule change, a system mode change, a fan setting change, an installer set-up change, an exit/entry remote setting change, among others.

Figure 11:
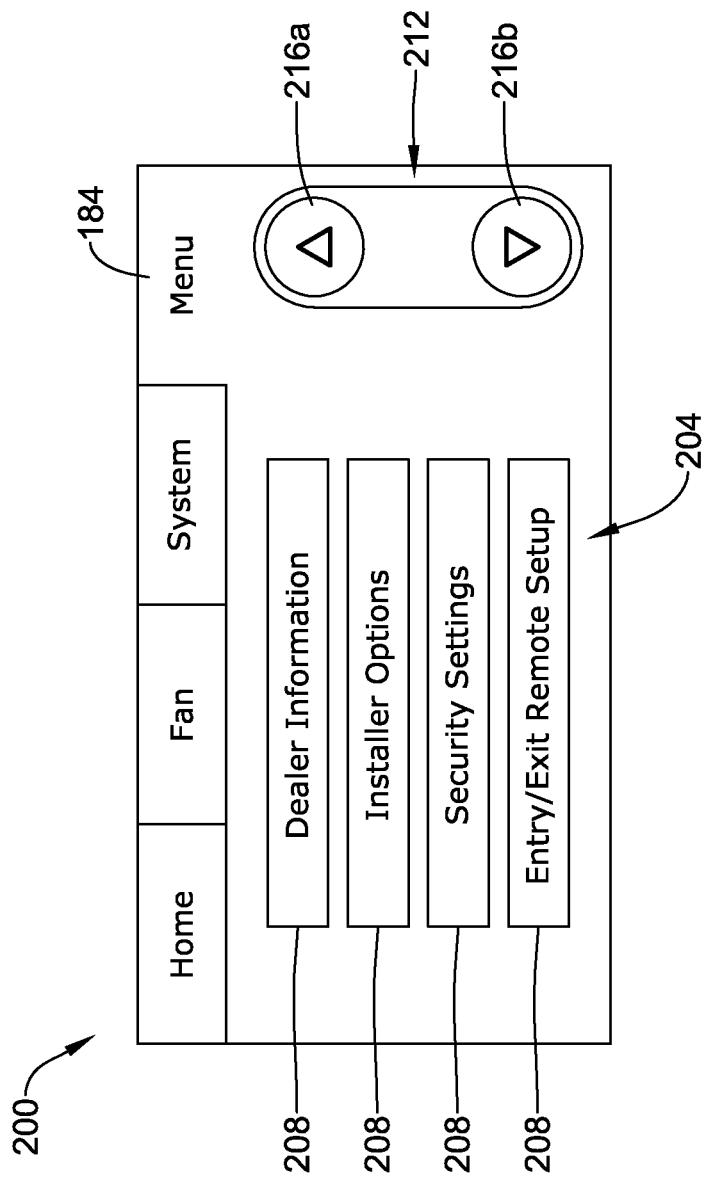

FIG. 11 shows an illustrative example of a menu screen 200 that may be displayed when a user selects the MENU button or tab 184 on home screen 172 of FIG. 10. The illustrative menu screen 200 may include a table 204 that includes one or more selectable menu options 208 that may be selected by the user. In some cases, the table 204 may be a scrolling table, in which case the menu screen 200 may also include a scroll bar 212 including first and second arrows 216a, 216b that may facilitate a user in scrolling through the available menu options 208.

In some cases, an Entry/Exit Remote Set-Up option 208 may be provided, which may provide access to a series of successive entry/exit remote set-up screens that may allow a user to configure the HVAC controller 18 such that it is capable of interacting with a control unit such as, for example, a control unit 40. It should be noted, that the control unit 40 may be incapable of commanding the HVAC controller 18 to place the HVAC controller 18 in a selected operational mode until the HVAC controller 18 is configured to enroll and interact with the control unit 40.

FIGS. 12-16 show a series of successive entry/exit remote set-up screens 220, 222, 224, 226, and 228 that may facilitate a user in setting one or more temperature set points for one or more operational modes of the HVAC system 4 and to enable the HVAC controller 18 to properly interact with an entry/exit remote (e.g. control unit 40). Selection of the entry/exit remote set-up option 208 in FIG. 11 may cause the HVAC controller 18 to initially display mode selection screen 220. Mode selection screen 220 may include a user prompt 232, which may prompt a user to select a mode for which they desire to set or modify a temperature set-point, a humidity set-point, a combination thereof, or any other suitable parameters. In the illustrative embodiment, mode selection screen 220 provides individually selectable options 236a, 236b, 236c, where each selectable option 236a, 236b, 236c corresponding to an operational mode of the HVAC system 4. The individually selectable options 236a, 236b, and 236c may be represented by individually selectable buttons or icons provided on the screen 220. In some instances, mode selection screen 220 may provide a first selectable option 236a corresponding to a first operating mode (e.g. home or occupied), a second selectable option 236b corresponding to a second operating mode (e.g. away or unoccupied), and a third selectable option 236c corresponding to a third operating mode (e.g. vacation or holiday). These are just examples. It will be understood that mode selection screen 220 may provide fewer or additional selectable options, each corresponding to different modes.

Mode selection screen 220 may also include a "Help" button 242 that, when selected, may cause the HVAC controller 18 to display additional information about the mode selection screen 220 that may be useful to the user. Additionally, mode selection screen 220 may include a DONE button 244 that, when selected, may cause the HVAC controller 18 to display a previous screen such as, for example, menu screen 200 of FIG. 11 or a home screen such as, for example, home screen 172 of FIG. 10.

Figure 13:
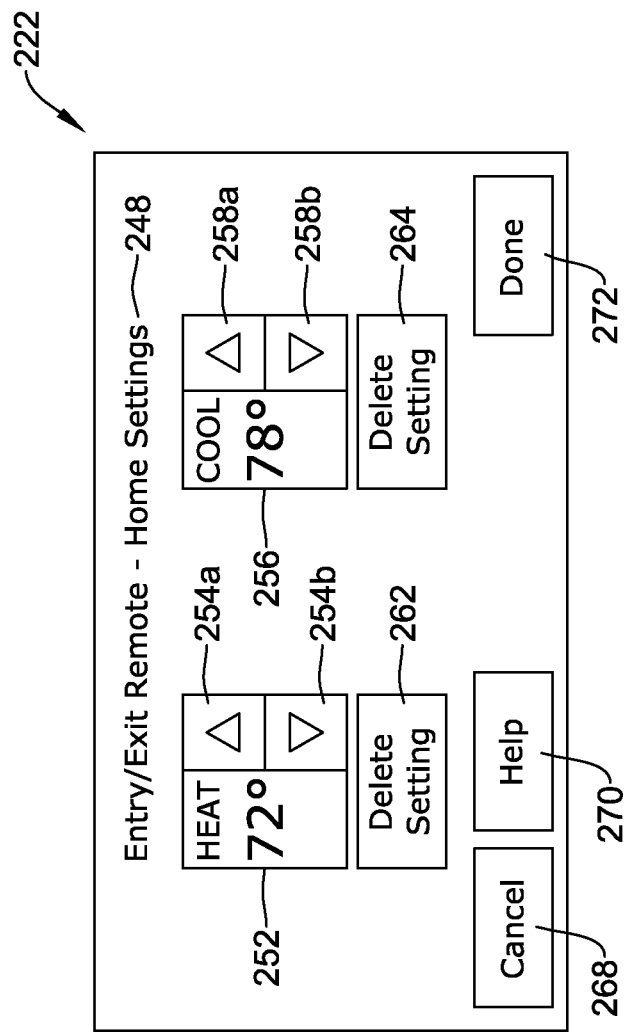

Upon selection of the first selectable option 236a, corresponding to a first mode (e.g. home or occupied), the HVAC controller 18 may display a first mode settings screen 222, as shown in FIG. 13. The first mode setting screen 222 may include a banner 248 that identifies the current mode (e.g. home, away, or vacation) for which the settings may be modified. First mode setting screen 222 may be used for adjusting a temperature set point, a humidity set point or a combination thereof corresponding to the first operating mode. In this example, the first operating mode corresponds to a mode in which the user is home or the building is occupied. In some instances, as shown, first mode setting screen 222 may display a heating temperature set point 252, with first and second arrows 254a, 254a for adjusting the heating temperature set point. In addition, first mode setting screen 222 may display a cooling temperature set point 256, with first and second arrows 258a, 258b for adjusting the cooling temperature set point. In some instances, a button 262, 264 for deleting or restoring a temperature set point 252, 256 may also be displayed, and may include a "delete settings" label as shown in the figure. The button 262, 264 may allow a user to quickly delete or restore a setting for a selected temperature set point.

If a temperature set point is deleted, then the corresponding operating mode may be disabled. For example, if the "delete settings" button 262 of FIG. 13 were selected, the heating set point 252 may be removed or grayed out, and the HVAC controller 18 may not respond to a command from a control unit 40 calling for the first operating mode when the HVAC system 4 is in a heating mode. If a temperature set point is deleted, then the corresponding operating mode may be disabled. For example, if the "delete settings" button 262 of FIG. 13 were selected, the heating set point 252 for the first operating mode may be removed or grayed out, and the HVAC controller 18 may not respond to a command from a control unit 40 calling for the first operating mode when the HVAC system 4 is heating. Likewise, if the "delete settings" button 264 of FIG. 13 were selected, the cooling set point 252 for the first operating mode may be removed or grayed out, and the HVAC controller 18 may not respond to a command from a control unit 40 calling for the first operating mode when the HVAC system 4 is cooling.

First mode setting screen 222 may also include a "Cancel" button 268 that, when selected, may cause the HVAC controller 18 to display a previous screen such as, for example, mode selection screen 220, and a "Help" button 270 that, when selected, may cause the HVAC controller 18 to display additional information about the first mode setting screen 222 that may be useful to the user. Additionally, first mode setting screen 222 may include a DONE button 272 that, when selected, may cause the HVAC controller 18 to display a previous screen such as, for example, mode selection screen 220 of FIG. 12 or, some cases, a home screen such as, for example, home screen 172 of FIG. 10.

Figure 12:
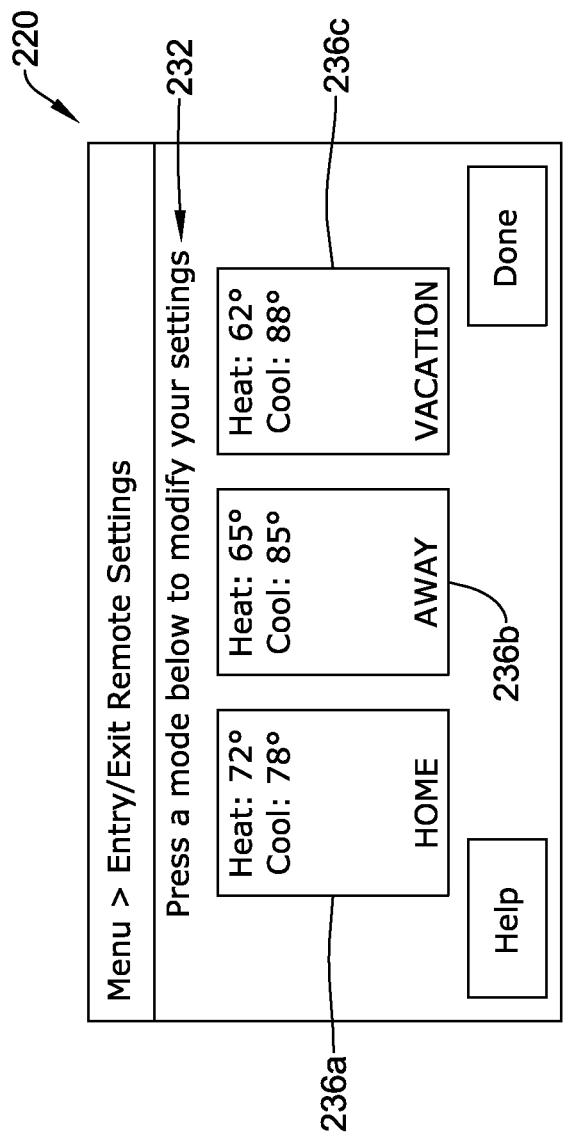
Figure 14:
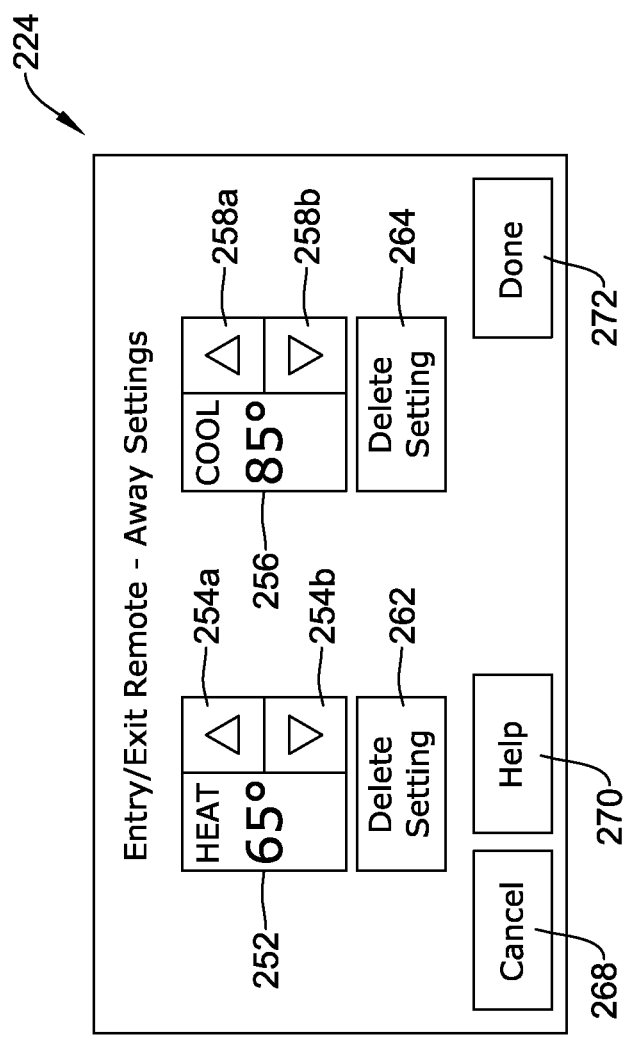
Figure 15:
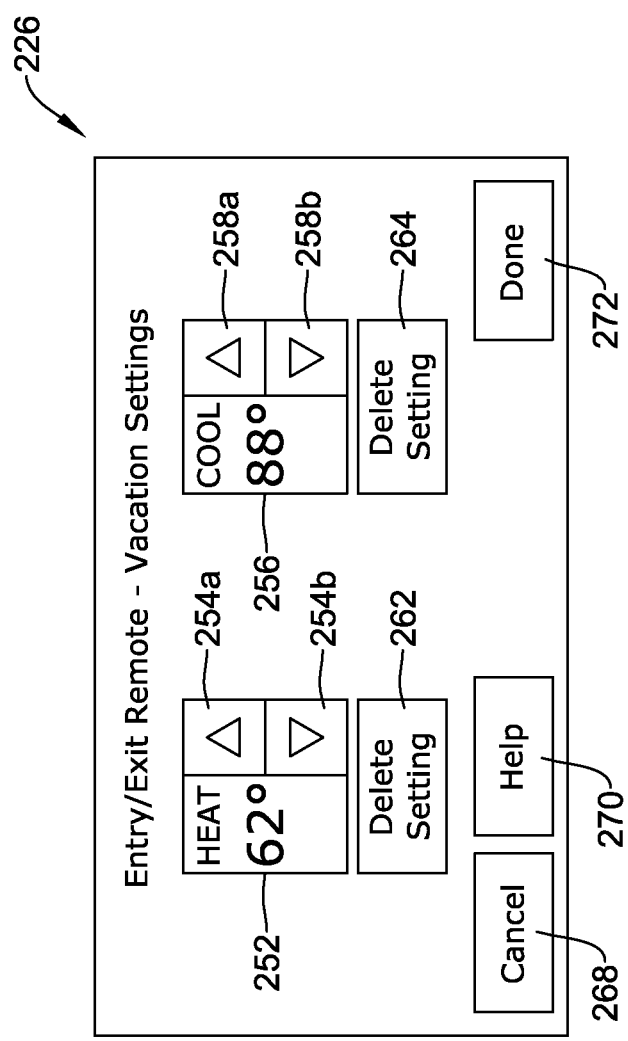
Figure 16:
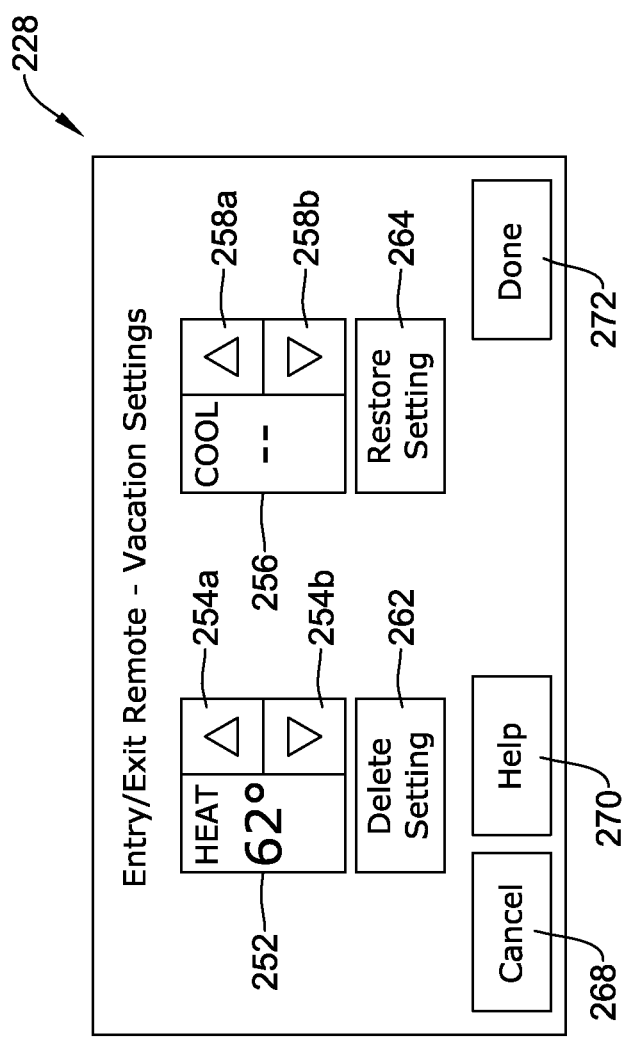

Similar screens, as shown in FIGS. 14-16, may be displayed by the HVAC controller 18 for each additional mode (e.g. the second and third operating modes) that may be selected through the mode selection screen 220 of FIG. 12. For example, FIG. 14 shows an exemplary screen 224 that may be displayed when the second selectable option 236b corresponding to a second operating mode is selected by a user. In this example, the second mode may correspond to when the building's occupants are away. In other cases, the second operating mode may correspond to when the building's occupants are asleep or inactive. FIG. 15 shows an exemplary screen 226 that may be displayed by the HVAC controller 18 when the third selectable option 236c corresponding to a third mode is selected by a user through the mode selection screen 220 of FIG. 12. In this example, the third operating mode may correspond to when the building's occupants may be away for an extended period of time such over a vacation or holiday.

FIG. 16 provides another view of screen 226 shown in FIG. 15. As shown in FIG. 16, the temperature set point 256 for cooling has been deleted. As such, the third operating mode for cooling may be disabled for the HVAC controller 18, and the HVAC controller 18 may not respond to a command from a control unit (e.g. control unit 40) to operate in the third mode when the HVAC system 4 is cooling. Additionally, as shown in the figure, button 264 may now include a "restore settings" label, which when selected, may restore the previous cooling temperature set point and enable the third operating mode for cooling for the HVAC controller 18.

The HVAC controller 18 may be enabled to operate in a selected mode (e.g. first mode, second mode and/or third mode) if a parameter set point (e.g. temperature set point, humidity set point, or combination thereof) is provided for that mode. In many cases, the parameter set points for each of the different modes for heating and/or cooling may be entered by a user through a series of screens displayed on the user interface of the HVAC controller 18, as described above, and stored in the controller memory 52. In some cases, default parameter set points for each of the different modes (e.g. home, away, and vacation) may be provided by the manufacturer and stored in the controller memory 52. The user may either chose to accept the default parameter set points set by the manufacturer, adjust the default parameter set points to a desired parameter set point for a selected mode, and/or use the "delete settings" button 262, 264 to delete a parameter set point for a selected mode thus, disabling the HVAC controller 18 for that selected mode. If the HAC controller 18 has no parameter set point for a selected mode, then the HVAC controller 18 may be disabled for that mode, and it will not respond to a command from a control unit (e.g. control unit 40) to operate in that mode. Instead, the HVAC controller 18 may continue to operate as if no command was received, such as in according with a predetermined temperature schedule, in accordance with a temporary or permanent hold temperature, or in any other suitable manner.

In use, an HVAC controller 18 such as, for example, a wall-mountable thermostat, may be configured to operate in accordance with a predetermined schedule stored in the controller memory 52 until one or more commands are received from a control unit such as, for example, control unit 40. When one or more commands are received from a control unit 40 to operate in a selected mode such as, for example, the first operating mode, the HVAC controller 18 may operate in the first operating mode according to a first predetermined temperature set point associated with the first mode, assuming the first operating mode is enabled for the particularly HVAC controller 18. When one or more commands are received from an enrolled control unit 40 that instruct the HVAC controller 18 to operate in a second operating mode, the HVAC controller 18 may operate in the second operating mode at a second predetermined temperature set point, if the second operating mode is enabled for the particular HVAC controller 18. Similarly, when one or more commands are received from a control unit 40 that instruct the HVAC controller 18 to operate in a third operating, the HVAC controller 18 may operate in the third operating mode at a third predetermined temperature set point, if the third operating mode is enabled for the HVAC controller 18.

Figure 17:
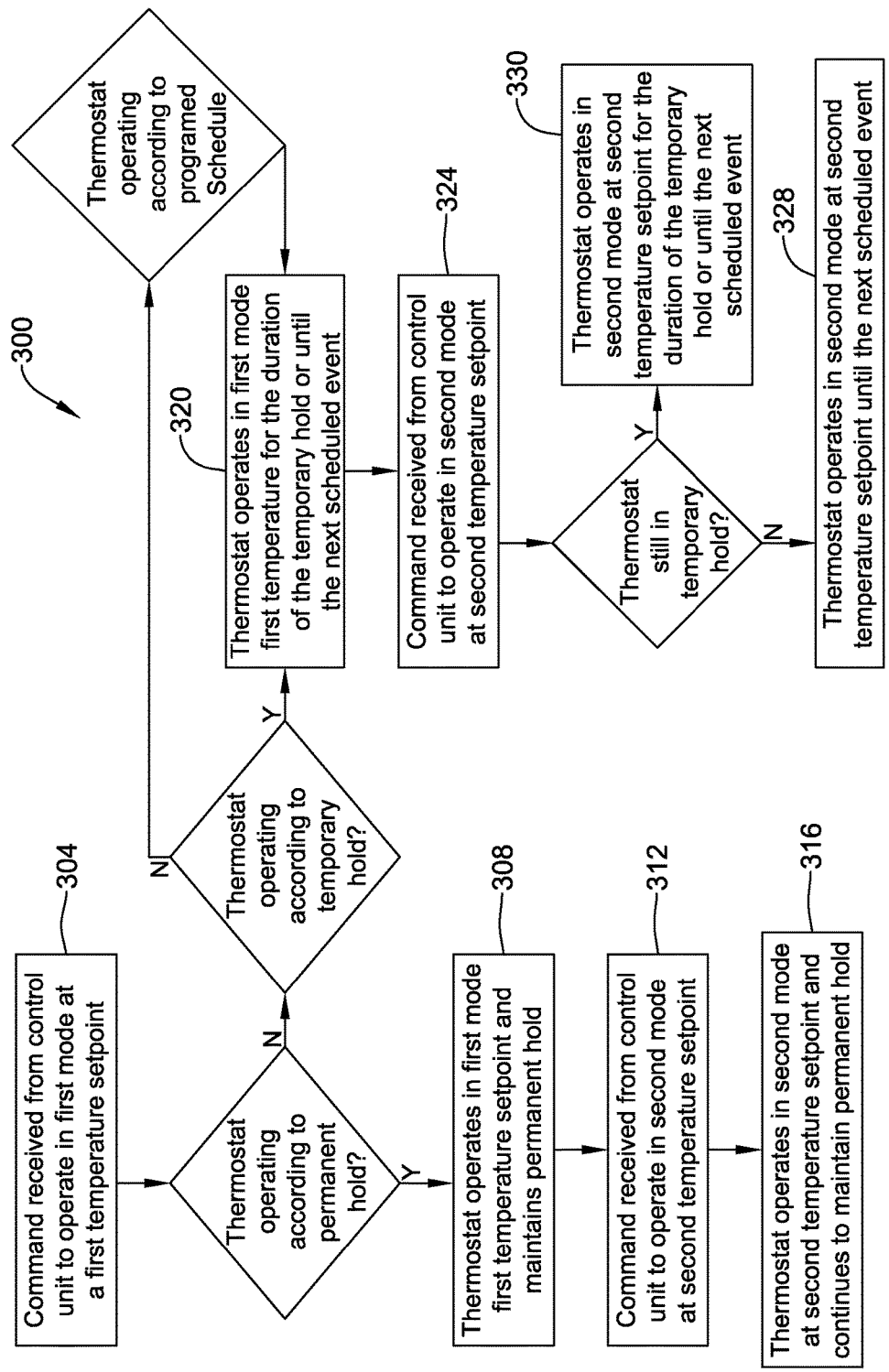

When one or more commands are received, the HVAC controller 18 may be operating according to a permanent hold or a temporary hold entered by a user through the user interface of the HVAC controller 18. In some instances, the HVAC controller 18 may be operating according to a predetermined schedule. FIG. 17 is a flow chart 300 showing an illustrative method that may be used by the HVAC controller 18 in such a situation. As shown in FIG. 17, the HVAC controller 18 may receive a command from a remotely located control unit (e.g. control unit 40) to operate in a first mode (e.g. home) at a first temperature set point (Box 304). If the HVAC controller 18 was previously placed in a permanent hold by a user, such as through the user interface of the HVAC controller 18, the HVAC controller 18 may receive the command from the control unit 40 and operate in the first operating mode at the first temperature set point and will maintain the first temperature set point in permanent hold until the permanent hold is cancelled by a user through the user interface (Box 308). In some cases, the HVAC controller 18 may subsequently receive a command from the control unit 40 to operate in a second mode at a second temperature set point (Box 312). The HVAC controller 18, still in a permanent hold, may operate in the second mode at the second temperature set point, and maintain the second temperature set point in permanent hold until the permanent hold is cancelled by a user through the user interface (Box 316).

In another example, a HVAC controller 18 may receive a command from a remotely located control unit (e.g. control unit 40) to operate in a first mode (e.g. home) at a first temperature set point (Box 304). If the HVAC controller 18 was previously placed in a temporary hold by a user, such as through the user interface of the HVAC controller 18, the HVAC controller 18 may receive the command from the control unit 40 and operate in the first operating mode at the first temperature set point for the duration of the temporary hold or until a next scheduled event of a programmable schedule (Box 316). Similarly, if the HVAC controller 18 is operating according to a programmed schedule, the HVAC controller 18 may receive the command from the control unit 40 and operate in the first operating mode at the first temperature set point until the next scheduled event of the programmed schedule (Box 320). In some cases, the HVAC controller 18 may subsequently receive a command from the control unit 40 to operate in a second mode at a second temperature set point (Box 314). The HVAC controller 18, if still in a temporary hold, may operate in the second mode at the second temperature set point for the remainder of the duration of the temporary hold or until the next schedule event (Box 328 and 330). Similarly, if the HVAC controller 18 is operating according to a programmed schedule and receives a command from the control unit 40 to operate in a second mode at a second temperature set point, the HVAC controller 18 may operate in the second mode at the second temperature set point until the next scheduled event of the programmed schedule.

FIG. 18 is a flow chart 400 showing an illustrative method that may be used by the HVAC controller 18 when operating in a permanent hold or a temporary hold, and a command is receive from a remotely located control unit such as, for example control unit 40 to operate in a vacation mode at predetermined set point. In one example, the HVAC controller 18 may receive a command from a control unit (e.g. control unit 40) to operate in a vacation/holiday mode (sometimes referred to herein as the third operating mode) at a predetermined set point (Box 404). If the HVAC controller 18 was previously placed into a permanent hold through the user interface of the HVAC controller 18 prior to receiving the command from the control unit 40, then the HVAC controller 18 may operate in the vacation/holiday mode at the predetermined temperature set point and maintain the permanent hold (Box 408). In some cases, the permanent hold may be maintained until it is cancelled by a user through the user interface of the HVAC controller 18. If the HVAC controller 18 was operating according to a temporary hold or according to a predetermined schedule prior to receiving the command from the control unit 40, then the HVAC controller 18 may initiate a permanent hold and operate at the predetermined temperature set point of the vacation/holiday mode until another command is received either from the control unit 40 or the permanent hold is cancelled by the user through the user interface (Box 412) of the HVAC controller 18.

Having thus described several illustrative embodiments of the present disclosure, those of skill in the art will readily appreciate that yet other embodiments may be made and used within the scope of the claims hereto attached. It will be understood, however, that this disclosure is, in many respect, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A remote wall-mountable control unit for use with an HVAC system that is controlled by at least one thermostat, wherein at least one of the at least one thermostat has one or more system modes including at least one of a heating mode and a cooling mode and including a temporary hold mode, at least one of the heating mode and cooling mode including both a first operating sub-mode and a second operating sub-mode, the temporary hold mode having a temporary hold temperature set point, which over-rides a programmable schedule for a temporary hold mode duration, the first operating sub-mode including a corresponding existing first temperature set point programmed into the thermostat and the second operating sub-mode including a corresponding existing second temperature set point programmed into the thermostat, wherein the first temperature set point is different from the second temperature setpoint, the remote control unit comprising:
 a wall-mountable housing;
 a user interface including a first dedicated electro-mechanical button housed by the wall-mountable housing that when pressed selects the first operating sub-mode, and a second dedicated electro-mechanical button housed by the wall-mountable housing that when pressed selects the second operating sub-mode;
 a controller in communication with the user interface, wherein upon selection of the first selectable mode option via the first dedicated electro-mechanical button of the remote control unit, the controller sends an instruction to the at least one thermostat of the HVAC system instructing the at least one thermostat to operate in its first operating sub-mode using the existing first temperature set point programmed into the thermostat to cause the at least one thermostat to operate in the first operating sub-mode at the first temperature set point for remainder of the temporary hold mode duration, and wherein upon selection of the second selectable mode option via the second dedicated electro-mechanical button of the remote control unit, the controller sends an instruction to the at least one thermostat of the HVAC system instructing the at least one thermostat of the HVAC system to operate in its second operating sub-mode using the existing second temperature set point programmed into the thermostat to cause the at least one thermostat to operate in the second operating sub-mode at the second temperature set point for remainder of the temporary hold mode duration; and a communications interface for communicating the instructions to the at least one thermostat.

2. The remote control unit of claim 1, wherein the first operating sub-mode corresponds to an occupied mode of the at least one thermostat.

3. The remote control unit of claim 2, wherein the second operating sub-mode corresponds to an unoccupied mode of the at least one thermostat.

4. The remote control unit of claim 3, wherein:
the at least one thermostat has a third operating sub-mode with a corresponding third temperature set point programmed into the thermostat;
the user interface of the remote control unit includes a third dedicated electro-mechanical button housed by the wall-mountable housing that when pressed selects the third operating sub-mode, wherein upon selection of the third selectable mode option, the controller of the remote control unit sends an instruction to the at least one thermostat of the HVAC system instructing the at least one thermostat of the HVAC system to operate in its third operating sub-mode at the third temperature set point programmed into the thermostat.

5. The remote control unit of claim 4, wherein the third operating sub-mode corresponds to a holiday mode of the at least one thermostat.

6. The remote control unit of claim 4, wherein the third operating sub-mode corresponds to a sleep mode of the at least one thermostat.

7. The remote control unit of claim 1, wherein the housing includes one or more openings for receiving at least part of a fastener for fastening the wall-mountable housing to a wall.

8. The control unit of claim 1, wherein the user interface includes a connect option, wherein upon selection of the connect option, the control unit is programmed to enroll the control unit with the at least one thermostat and establish a communication link with the at least one thermostat via the communications interface.

9. The control unit of claim 8, wherein the connect option is inaccessible at the front surface of the control unit.

10. The control unit of claim 8, wherein the connect option is behind a removable face plate.

11. The control unit of claim 1, wherein the user interface of the control unit does not include a display screen.

12. A control unit for use with an HVAC system that is controlled by at least one thermostat, wherein at least one of the at least one thermostat has one or more system modes including at least one of a heating mode and a cooling mode and including a temporary hold mode, at least one of the heating mode and cooling mode including both a first operating sub-mode and a second operating sub-mode, the temporary hold mode having a temporary hold temperature set point, which over-rides a programmable schedule for a temporary hold mode duration, the first operating sub-mode including a corresponding existing first temperature set point programmed into the thermostat and the second operating sub-mode including a corresponding existing second temperature set point programmed into the thermostat, wherein the first temperature set point is different from the second temperature setpoint, the control unit comprising:

a housing;

a user interface including a first dedicated electro-mechanical button housed by the housing that may be pressed in order to select the first operating sub-mode and a second dedicated electro-mechanical button housed by the housing that may be pressed in order to select the second operating sub-mode;

a controller in communication with the user interface, wherein upon selection of the first selectable mode option, the controller sends an instruction to the at least one thermostat of the HVAC system instructing the at least one thermostat to operate in the first operating sub-mode using the existing first temperature set point programmed into the thermostat to cause the at least one thermostat to operate in the first operating sub-mode at the first temperature set point for remainder of the temporary hold mode duration, and wherein upon selection of the second selectable mode option, the controller sends an instruction to the at least one thermostat of the HVAC system instructing the at least one thermostat of the HVAC system to operate in the second operating sub-mode using the existing second temperature set point programmed into the thermostat to cause the at least one thermostat to operate in the second operating sub-mode at the second temperature set point for remainder of the temporary hold mode duration; and a communications interface for communicating the one or more commands to the at least one thermostat, wherein the communications interface is a wireless interface.

13. The control unit of claim 1, wherein the user interface of the control unit further includes an LED indicator.

14. The control unit of claim 13, wherein the user interface of the control unit does not include a display screen.

15. A thermostat for controlling an HVAC system, the thermostat comprising:

a user interface;

a controller coupled to the user interface, the controller having one or more system modes including at least one of a heating mode and a cooling mode, one or more of the system modes having a first operating sub-mode within the system mode, the first operating sub-mode having a corresponding existing first temperature set point programmed into the controller and a second operating sub-mode within the same system mode as the first operating sub-mode, the first operating sub-mode having a corresponding existing second temperature set point programmed into the controller, the controller allowing a user to enable and/or disable each of the first operating sub-mode and the second operating sub-mode using the user interface;

a communications interface coupled to the controller for receiving one or more commands from a remotely located control unit, wherein the one or more commands instruct the controller to operate in the first operating sub-mode or the second operating sub-mode; and wherein when one or more commands are received from the communications interface that instruct the controller to operate in the first operating sub-mode of the controller, the controller operates in the first operating sub-mode of the controller at the first existing temperature set point programmed into the controller if the first operating sub-mode is enabled, and when one or more commands are received from the communications interface that instruct the controller to operate in the second operating sub-mode of the controller, the controller operates in the second operating sub-mode of the controller at the second existing temperature set point programmed into the controller if the second operating sub-mode is enabled;

wherein the controller is configured to operate in accordance with a temporary hold mode having a temporary hold temperature set point, which over-rides a programmable schedule for a temporary hold mode duration, until such time as the temporary hold expires and/or the one or more commands are received from the remotely located control unit;

wherein when one or more commands are received from the communications interface that instruct the controller to operate in the first operating sub-mode during the temporary hold mode duration, the controller operates in the first operating sub-mode at the first temperature set point for the remaining of the temporary hold mode duration if the first operating sub-mode is enabled; and wherein when one or more commands are received from the communications interface that instruct the controller to operate in the second operating sub-mode during the temporary hold mode duration, the controller operates in the second operating sub-mode at the second temperature set point for the remaining of the temporary hold mode duration if the second operating sub-mode is enabled.

16. The thermostat of claim 15, wherein the controller is configured to operate in accordance with a programmable schedule unless the controller is operating in the temporary hold mode and/or until the one or more commands are received from the remotely located control unit, and:

when one or more commands are received from the communications interface that instruct the controller to operate in the first operating sub-mode, the controller continues to operate in accordance with the programmable schedule if the first operating sub-mode is disabled; and when one or more commands are received from the communications interface that instruct the controller to operate in the second operating sub-mode, the controller continues to operate in accordance with the programmable schedule if the second operating sub-mode is disabled.

17. The thermostat of claim 15, wherein the controller is configured to operate in accordance with a permanent hold mode having a permanent hold temperature set point, which over-rides a programmable schedule, unless the controller is operating in the temporary hold mode, until the one or more commands are received from the remotely located control unit, and:

when one or more commands are received from the communications interface that instruct the controller to operate in the first operating sub-mode, the controller operates in the first operating sub-mode at the first temperature set point if the first operating sub-mode is enabled, and maintains the permanent hold mode at the first temperature set point; and when one or more commands are received from the communications interface that instruct the controller to operate in the second operating sub-mode, the controller operates in the second operating sub-mode at the second temperature set point if the second operating sub-mode is enabled, and maintains the permanent hold mode at the second temperature set point.

18. The thermostat of claim 15, wherein the controller is configured to operate in accordance with a programmable schedule when not operating in the temporary hold mode, until the one or more commands are received from the remotely located control unit, and:

when one or more commands are received from the communications interface that instruct the controller to operate in the first operating sub-mode, the controller operates in the first operating sub-mode at the first temperature set point for a period of time if the first operating sub-mode is enabled; and when one or more commands are received from the communications interface that instruct the controller to operate in the second operating sub-mode, the controller operates in the second operating sub-mode at the second temperature set point for a period of time if the second operating sub-mode is enabled.

19. The thermostat of claim 18, wherein the period of time corresponds to a default temporary hold duration.

20. A system for controlling one or more components of an HVAC system, the system comprising:

at least one thermostat including a user interface, a memory and a controller programmed to accept a predetermined set point from a user for a selected operating sub-mode within a heating mode or cooling mode entered through the user interface and to store the predetermined set point in the memory for the selected operating sub-mode; and a separate control unit having a wall-mountable housing that includes one or more mounting features for mounting the housing to a wall, the control unit is configured to be wirelessly coupled to the at least one thermostat, the control unit including a user interface including a first electro-mechanical button housed by the wall-mountable housing that is pressable in order to select a first operating sub-mode of the at least one thermostat and a second electro-mechanical button housed by the wall-mountable housing that is pressable in order to select a second operating sub-mode within the heating mode or cooling mode of the at least one thermostat, the control unit further having a controller contained within the housing and coupled to the user interface of the control unit, where upon selection of the first selectable sub-mode option or the second selectable sub-mode option, the controller of the control unit sends instructions to the at least one thermostat, instructing the at least one thermostat to operate in the selected operating sub-mode at the predetermined set point stored in the memory that corresponds to the selected operating sub-mode, wherein the at least one thermostat is configured to operate in accordance with a temporary hold mode having a temporary hold temperature set point, which over-rides a programmable schedule for a temporary hold mode duration, until such time as the temporary hold expires and/or one or more commands are received from the separate control unit;

wherein when the one or more commands are received from the separate control unit that instruct the at least one thermostat to operate in the first operating sub-mode during the temporary hold mode duration, the at least one thermostat operates in the first operating sub-mode at the first temperature set point for the remaining of the temporary hold mode duration if the first operating sub-mode is enabled; and wherein when the one or more commands are received from the separate control unit that instruct the at least one thermostat to operate in the second operating sub-mode during the temporary hold mode duration, the at least one thermostat operates in the second operating sub-mode at the second temperature set point for the remaining of the temporary hold mode duration if the second operating sub-mode is enabled.

21. The system of claim 20, wherein the at least one thermostat is configured to not respond to instructions received from the control unit when there is no predetermined set point stored in the thermostat memory for the selected sub-mode.

22. The system of claim 20, further comprising at least one additional thermostat wirelessly coupled to the control unit located in a separate region from the at least one thermostat, the at least one additional thermostat including a user interface, a memory and a controller programmed to accept a predetermined set point from a user for a selected operating sub-mode entered through the user interface and to store the predetermined set point in the memory for the selected mode.

23. The system of claim 22, wherein the predetermined set point stored in the memory of the at least one thermostat is different than the predetermined set point stored in the memory of the at least one additional thermostat for the selected sub-mode.

24. The system of claim 20, wherein the user interface of the control unit includes a third electro-mechanical button housed by the wall-mountable housing that is selectable in order to select a third operating sub-mode of the at least one thermostat.

* * * * *